(12) United States Patent
Tomono et al.

(10) Patent No.: US 8,941,893 B2
(45) Date of Patent: Jan. 27, 2015

(54) IMAGE READING APPARATUS

(71) Applicants: Keitaro Tomono, Nagoya (JP);
Shinsuke Kaigawa, Kitanagoya (JP);
Takatoshi Ono, Nagoya (JP)

(72) Inventors: Keitaro Tomono, Nagoya (JP);
Shinsuke Kaigawa, Kitanagoya (JP);
Takatoshi Ono, Nagoya (JP)

(73) Assignee: Brother Kogyo Kabushiki Kaisha,
Nagoya-shi, Aichi-ken (JP)

( * ) Notice: Subject to any disclaimer, the term of this patent is extended or adjusted under 35 U.S.C. 154(b) by 0 days.

(21) Appl. No.: 14/041,208

(22) Filed: Sep. 30, 2013

(65) Prior Publication Data

US 2014/0118804 A1 May 1, 2014

(30) Foreign Application Priority Data

Oct. 25, 2012 (JP) ................................. 2012-235929

(51) Int. Cl.
*H04N 1/04* (2006.01)
*H04N 1/00* (2006.01)

(52) U.S. Cl.
CPC ....... *H04N 1/00811* (2013.01); *H04N 1/00408* (2013.01); *H04N 1/00623* (2013.01); *H04N 1/00806* (2013.01); *H04N 1/00822* (2013.01); *H04N 1/00824* (2013.01); *H04N 1/0405* (2013.01)
USPC ............................ 358/474; 358/498; 358/497

(58) Field of Classification Search
CPC .............. H04N 2201/0081; H04N 2201/0094; H04N 2201/3205; H04N 1/00411; H04N 1/00779; H04N 1/00912; H04N 1/121; H04N 1/2392; H04N 1/444; H04N 5/44543
USPC ............... 358/1.15, 1.14, 498, 1.6, 448, 1.13, 358/1.16, 1.2, 296, 305, 400, 440, 468, 471, 358/474, 496, 527, 49
See application file for complete search history.

(56) References Cited

U.S. PATENT DOCUMENTS

| 4,098,458 | A | * | 7/1978 | Auchinleck | .................... | 235/475 |
| 5,878,302 | A | * | 3/1999 | Inui et al. | ........................ | 399/81 |
| 6,710,895 | B1 | * | 3/2004 | Gatto et al. | ..................... | 358/1.6 |
| 7,309,287 | B2 | * | 12/2007 | Miyamoto et al. | .............. | 463/37 |
| 7,477,427 | B2 | * | 1/2009 | Fujikawa et al. | ............. | 358/474 |
| 7,612,904 | B2 | * | 11/2009 | Kadowaki | .................... | 358/1.15 |
| 7,672,977 | B2 | * | 3/2010 | Hara et al. | ............. | 707/999.107 |
| 8,018,632 | B2 | * | 9/2011 | Walker et al. | ................. | 358/498 |

(Continued)

FOREIGN PATENT DOCUMENTS

| JP | H10-65842 | A | 3/1998 |
| JP | 2003-208149 | A | 7/2003 |

(Continued)

OTHER PUBLICATIONS

U.S. Appl. No. 14/041,136, filed Sep. 30, 2013.

*Primary Examiner* — Negussie Worku
(74) *Attorney, Agent, or Firm* — Scully, Scott, Murphy & Presser, PC

(57) ABSTRACT

There is provided an image reading apparatus including: a reading device configured to read a manuscript supplied by a first or a second supply mode, a switching device configured to switch the first and second supply modes, a display, and a controller. The controller is configured to cause the display to display a first screen in a case that the switching device switches the supply mode to the first supply mode, as well as to cause the display to display a second screen in a case that the switching device switches the supply mode to the second supply mode.

11 Claims, 18 Drawing Sheets

(56) References Cited

U.S. PATENT DOCUMENTS

| | | | |
|---|---|---|---|
| 8,504,994 B2 * | 8/2013 | Golender et al. | 717/128 |
| 8,508,811 B2 * | 8/2013 | Safonov et al. | 358/474 |
| 8,525,753 B2 * | 9/2013 | Lazzaro et al. | 345/1.1 |
| 8,619,293 B2 * | 12/2013 | Sugino | 358/1.15 |
| 8,724,189 B2 * | 5/2014 | Safonov et al. | 358/474 |
| 8,727,347 B2 * | 5/2014 | Ishikawa | 271/265.04 |
| 2003/0144036 A1 | 7/2003 | Ito | |
| 2009/0310010 A1 | 12/2009 | Matsushima et al. | |
| 2009/0310889 A1 | 12/2009 | Matsushima et al. | |
| 2009/0310957 A1 | 12/2009 | Matsushima et al. | |

FOREIGN PATENT DOCUMENTS

| | | |
|---|---|---|
| JP | 2009-222951 A | 10/2009 |
| JP | 2010-033538 A | 2/2010 |
| JP | 2010033529 A | 2/2010 |

* cited by examiner

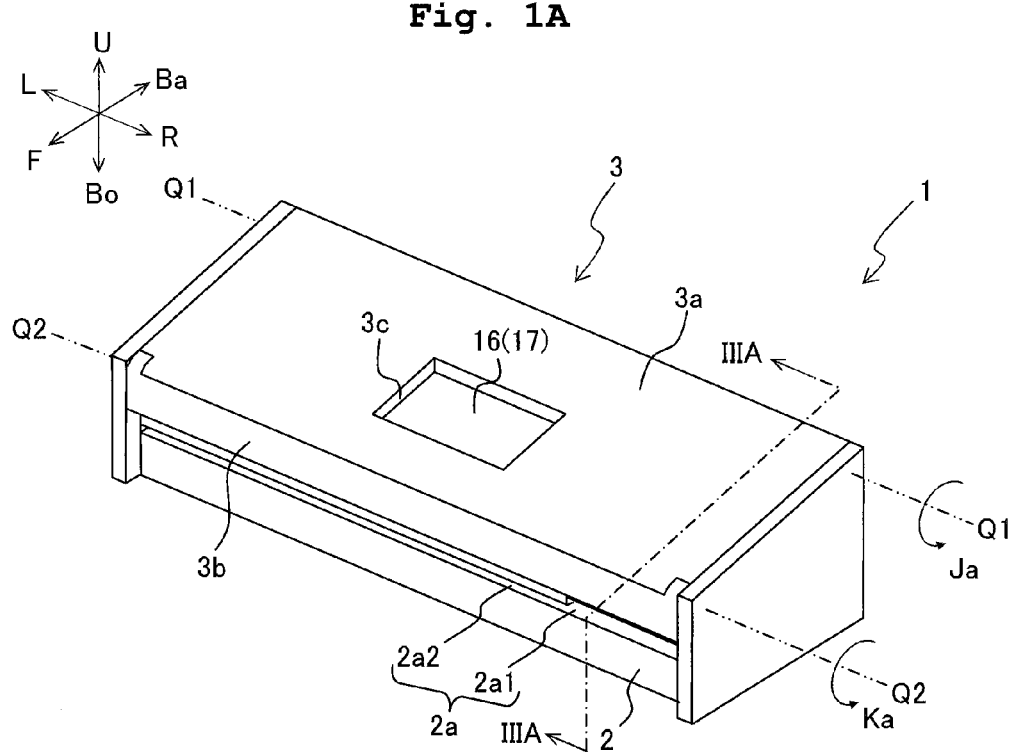
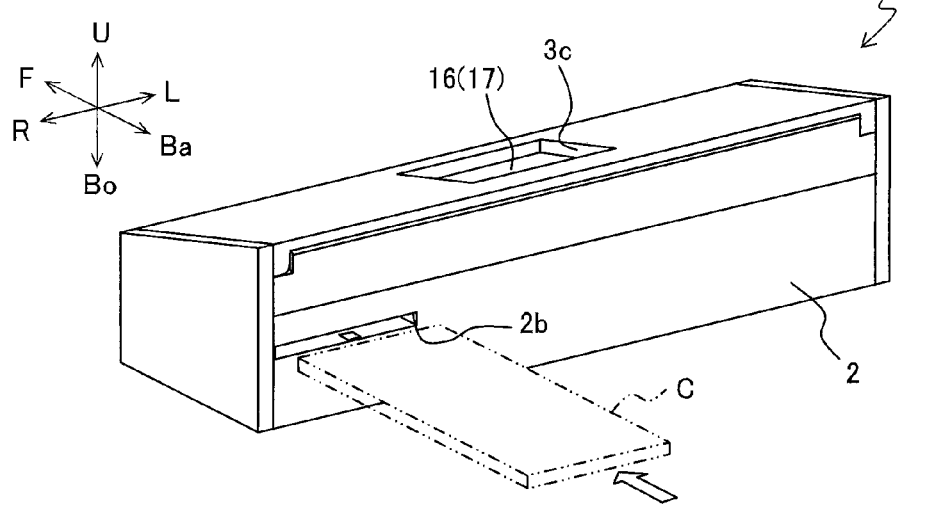

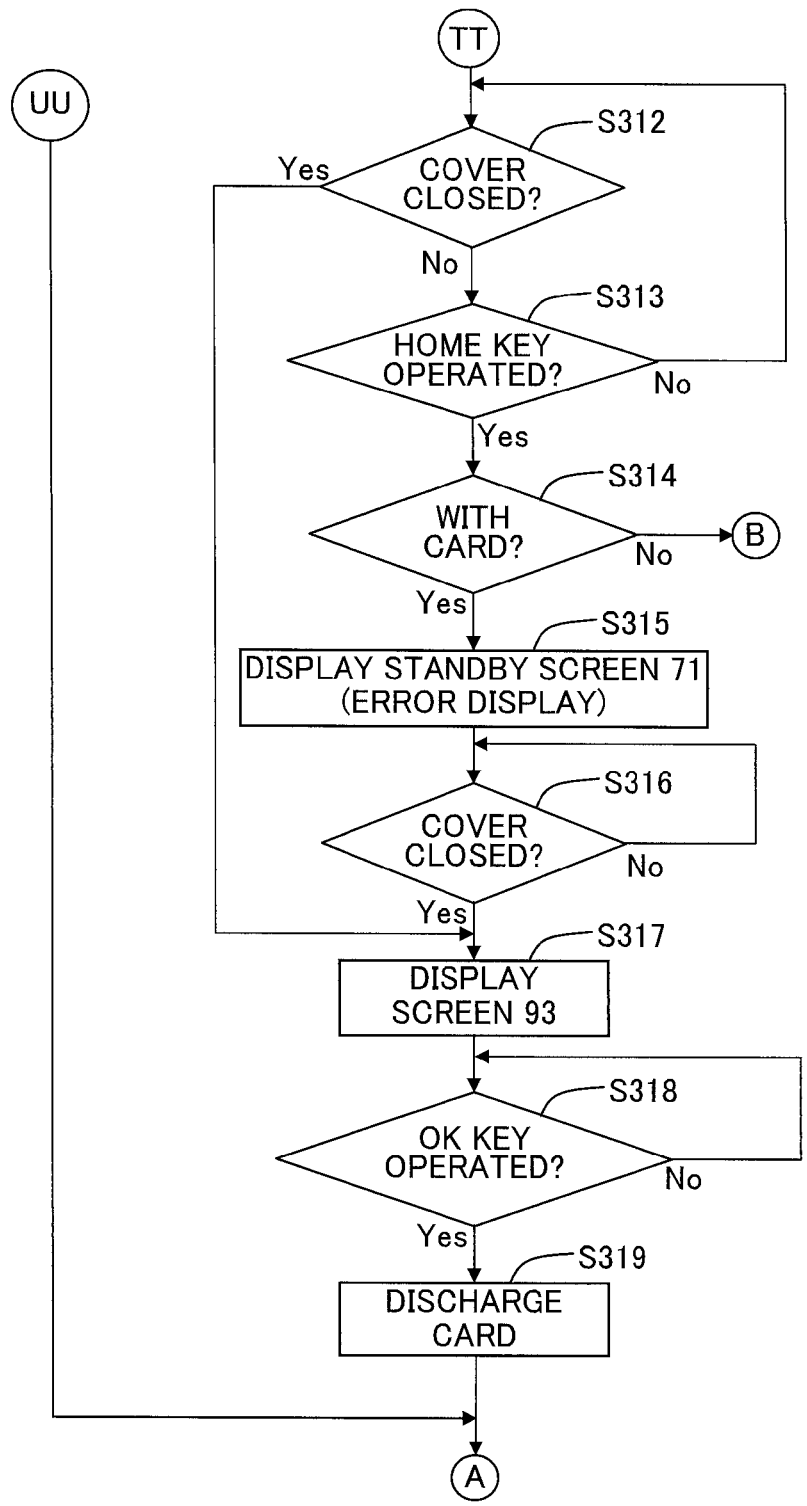

IMAGE READING APPARATUS

CROSS REFERENCE TO RELATED APPLICATION

The present application claims priority from Japanese Patent Application No. 2012-235929, filed on Oct. 25, 2012, the disclosure of which is incorporated herein by reference in its entirety.

BACKGROUND OF THE INVENTION

1. Field of the Invention

The present invention relates to an image reading apparatus.

2. Description of the Related Art

Conventionally, there have been known communication terminal apparatuses including an image reading apparatus which reads or scans manuscripts supplied by a manuscript supply method involving both an automatic manuscript supply device and a flatbed scanner.

SUMMARY OF THE INVENTION

In such an image reading apparatus as above, for example, operation keys are displayed on a display screen for carrying out various functions using the reading function. When a user manipulates a certain operation key, then the function corresponding to that operation key is carried out. In such case, for example, when it is possible to carry out a different operation with each supply mode, then such operation keys are also displayed as unique in one supply mode but unnecessary to display for another supply mode. Hence, it is bothersome for the user to find out desired operation keys.

The present invention is made in view of the above situation, and an object thereof is to provide an image reading apparatus capable of displaying a screen related to the reading which correspond to each supply mode when different supply modes are used for the manuscripts to be read by the reading function.

According to an aspect of the present invention, there is provided an image reading apparatus configured to read an image of a manuscript, including:

a reading device configured to read the manuscript supplied by a first supply mode or by a second supply mode different from the first supply mode;

a switching device configured to switch the supply mode between the first supply mode and the second supply mode;

a display; and a controller which is configured to cause the display to display a first screen related to reading, by the reading device, the manuscript supplied by the first supply mode in a case that the switching device switches the supply mode to the first supply mode for supplying the manuscript, as well as to cause the display to display a second screen, which is different from the first screen, related to reading, by the reading device, the manuscript supplied by the second supply mode in a case that the switching device switches the supply mode to the second supply mode for supplying the manuscript.

The present teaching is realizable through various aspects such as a controller controlling an image reading apparatus, an image reading system, an image reading method, an image reading program, a recording medium storing the image reading program, etc.

BRIEF DESCRIPTION OF THE DRAWINGS

FIG. 1A is a perspective view of a CDS observed from the right front side;

FIG. 1B is a perspective view of the CDS observed from the right rear side;

FIGS. 12A, 12B and 12C show another flowchart showing the error display process.

DESCRIPTION OF THE PREFERRED EMBODIMENT

Figure 2:
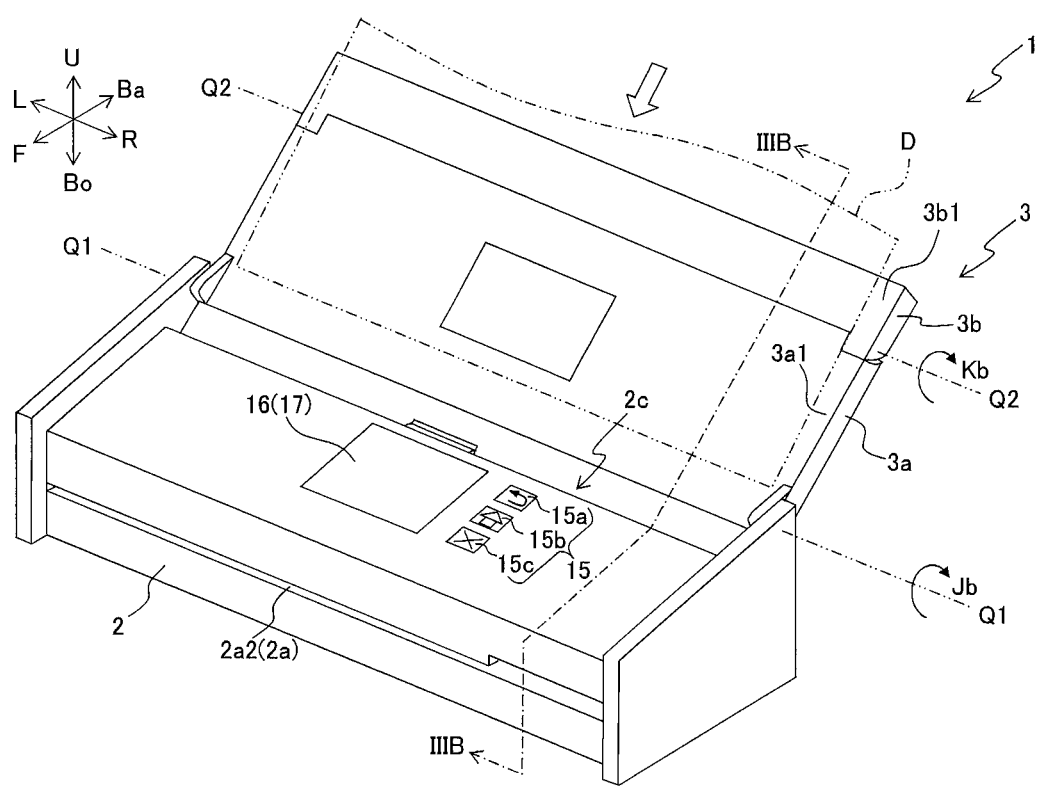
FIG. 2 is a perspective view of the CDS with its cover being opened.

Hereinbelow, referring to the accompanying drawings, an embodiment of the present teaching will be explained. In the illustrations of FIGS. 1A and 1B, a cover 3 is closed to a main body 2. Further, in each figure of FIGS. 1A through 3B, the upper side of a compact document scanner 1 (to be referred to below as CDS 1) is denoted by the arrow U, the lower side by the arrow Bo, the front side by the arrow F, the back side by the arrow Ba, the right side by the arrow R, and the left side by the arrow L. The CDS 1 in this embodiment is configured as a scanner (an image reading apparatus) capable of reading sheet-like manuscripts such as sheets of plain paper in the A4 size and the like, and heavy or thick manuscripts in a small size such as driver's licenses, credit cards, business cards and the like. Hereinbelow, the sheet-like manuscripts such as sheets of plain paper in the A4 size and the like will be referred to as "documents", while the heavy or thick manuscripts in a small size such as driver's licenses, credit cards, business cards and the like will be referred to as "cards".

The CDS 1 has the main body 2 which builds in an image reading sensor 18 (see FIGS. 3A and 3B) to read the documents or cards, and the cover 3 which is fitted to be openable from and closable to the main body 2. On the front side of the main body 2, a discharge slot 2a is provided for discharging a document D (see FIG. 2) or a card C which has been read by the image reading sensor 18. The discharge slot 2a includes a discharge slot 2a1 which is provided in the right side of the main body, and a discharge slot 2a2 which is shared partially with the discharge slot 2a1 and extends almost through the entire main body 2 in the left-right direction. The discharge slot 2a1 is provided for discharging the card C, while the discharge slot 2a2 is provided for discharging the document D. Therefore, between the vertical widths (in the up-down direction) of the discharge slot 2a1 and the discharge slot 2a2, the former is wider than the latter. This is because they respectively reflect the thicknesses of the card C and the document D to be discharged. On the other hand, on the back side of the main body 2, an insertion slot 2b is provided for inserting the card C into the main body 2. The card C inserted into the insertion slot 2b is transported through a first path V1 (see FIG. 3A) to be read by the image reading sensor 18. After being read by the image reading sensor 18, the card C is discharged from the discharge slot 2a1. Thus, the CDS 1 in this embodiment is able to cause the image reading sensor 18 to read the card C with the cover 3 being closed.

Further, on the upper side of the main body 2, an LCD 16 is provided to display various kinds of information. On the other hand, in the cover 3, an opening 3c is formed at such a position as to correspond to the LCD 16 with the cover 3 being closed. Thus, even when the cover 3 is closed, a user can still observe the screens displayed on the LCD 16 via the opening 3c. On the LCD 16, a touch panel 17 is superimposed to enable the user to input instructions to the CDS 1 by touching the touch panel 17 with fingers or the like via the opening 3c even when the cover 3 is closed.

The cover 3 includes a first cover 3a and a second cover 3b. The first cover 3a is fitted on the main body 2 to be revolvable about a revolving shaft Q1 via a hinge (not shown). By rotating the first cover 3a about the revolving shaft Q1 in the direction of arrow Ja, the cover 3 can be closed to the main body 2. With the cover 3 being closed, the first cover 3a covers the upper side of the main body 2. On the other hand, the second cover 3b is fitted on the first cover 3a to be revolvable about another revolving shaft Q2 via another hinge (not shown). When closing the cover 3, by rotating the second cover 3b about the revolving shaft Q2 in the direction of arrow Ka, the second cover 3b can be folded down from the first cover 3a. Thus, with the cover 3 being closed, the second cover 3b covers the upper part of the front side of the main body 2 above the discharge slot 2a.

By rotating the first cover 3a about the revolving shaft Q1 in the direction of arrow Jb, the cover 3 can be opened from the main body 2. By rotating the second cover 3b about the revolving shaft Q2 in the direction of arrow Kb, the cover 3 can be further opened from the first cover 3a. As a result, it is possible to flatly coordinate a back side 3b1 of the second cover 3b and a back side 3a1 of the first cover 3a. These flatly coordinated sides 3a1 and 3b1 function as a paper feed tray to load the document D to be read.

On the upper side of the main body 2, an insertion slot 2c is provided for inserting the document D into the main body 2. The document D loaded on the paper feed tray is inserted from the insertion slot 2c, transported through a second path V2 (see FIG. 3B) formed inside the main body, and read by the image reading sensor 18. The document D having been read by the image reading sensor 18 is discharged from the discharge slot 2a2 (discharge slot 2a). As shown in FIG. 2, the insertion slot 2c is exposed by opening the cover 3. Thus, the CDS 1 in this embodiment can cause the image reading sensor 18 to read the document D only when the cover 3 is opened.

As shown in FIG. 2, on the upper side of the main body 2, a Back key 15a, a Home key 15b, and an X key 15c are provided as a operation key 15. The Back key 15a is provided for switching the screen displayed on the LCD 16 to the screen displayed previously to the present screen. The Home key 15b is provided for displaying the home screen on the LCD 16 with the cover 3 being opened, that is, the uppermost screen in the screen group of a tree structure displayable with the cover 3 being opened. The X key 15c is provided for canceling a process being carried out such as the reading process or the like. The X key 15c is also a key to be manipulated for removing an error. By appropriately manipulating the keys 15a to 15c, the user is able to carry out the process corresponding to each of the keys 15a to 15c. Further, the keys 15a to 15c are provided at a position covered by the cover 3 when the cover 3 is closed. Thus, the keys 15a to 15c are only manipulable with the cover 3 being opened, but not manipulable with the cover 3 being closed.

Figure 3A:
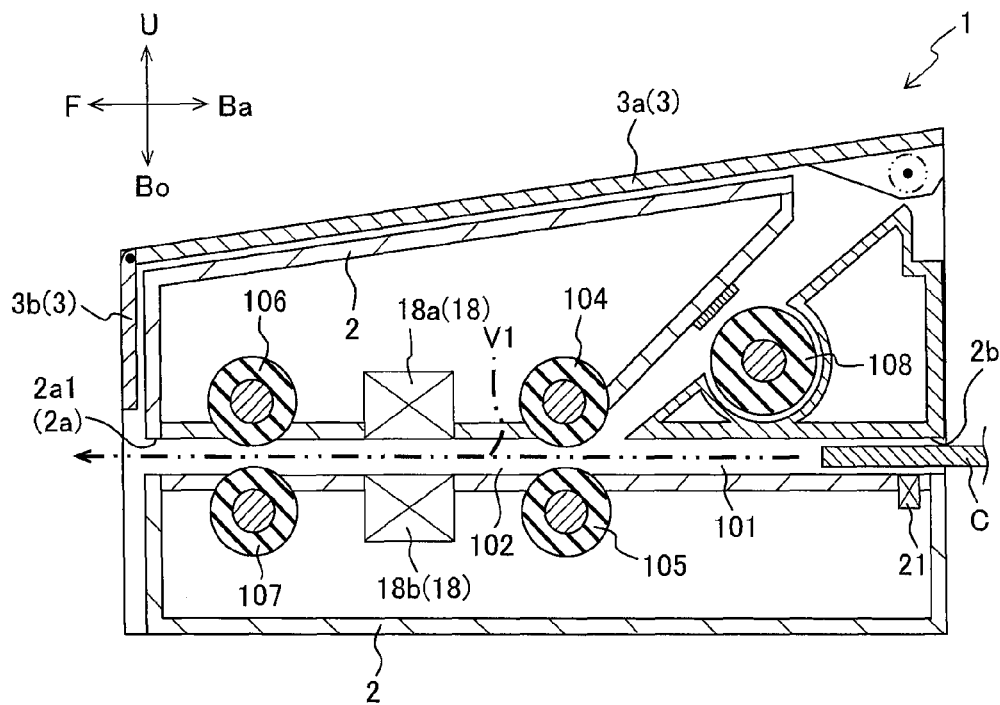
FIG. 3A is a schematic cross-sectional view of the CDS along the line IIIA-IIIA of FIG. 1A.

FIG. 3A shows a cross-sectional view of the CDS 1 with the cover 3 being closed. The CDS 1 in this embodiment is configured to be capable of reading the card C inserted from the insertion slot 2b with the cover 3 (the first and second covers 3a and 3b) being closed. The main body 2 is provided therein with a path 101 extending from the insertion slot 2b, and a path 102 being linked to the path 101 and extending to the discharge slot 2a2 (discharge slot 2a). At the path 102 on the side of the path 101, a pair of transport rollers 104 and 105 are provided to contact with and press each other, and to be rotatable respectively.

The transport rollers 104 and 105 are rotated by a driving motor 19 (see FIG. 4) to transport the card C toward the discharge slot 2a2 with the rotary force. On the other hand, at the path 102 on the side of the discharge slot 2a2, a pair of paper discharge rollers 106 and 107 are provided to contact with and press each other, and to be rotatable respectively. The paper discharge rollers 106 and 107 are rotated by the driving motor 19, too, to discharge the card C from the side of the discharge slot 2a2 with the rotary force. Further, one of the transport rollers 104 and 105 may be a driving roller which is caused to rotate by the driving force transmitted from the driving motor 19, while the other may be a driven roller which is driven to rotate by the rotation of the driving roller. This can also be applied to the paper discharge rollers 106 and 107.

A card detection sensor 21 is provided in the vicinity of the insertion slot 2b. With the cover 3 being closed, when the card detection sensor 21 detects the card C inserted from the insertion slot 2b, then the transport rollers 104 and 105 are once stopped with the card C being held (nipped) therebetween. Thereafter, subject to the condition that a reading start instruction is inputted, the transport rollers 104 and 105 are rotated again to transport the nipped card C toward the discharge slot 2a2. The card C transported by the transport rollers 104 and 105 are, subsequently, nipped by the paper discharge rollers 106 and 107 to be discharged from the discharge slot 2a2 by the rotation of the paper discharge rollers 106 and 107.

Between the transport rollers 104 and 105 and the paper discharge rollers 106 and 107, the image reading sensor 18 is provided to be capable of reading images on the surfaces of the card C passing through the path 102. In this embodiment, as the image reading sensor 18, there are provided a first image reading sensor 18a for reading the image on one surface (the front surface, for example) of the card C, and a second image reading sensor 18b for reading the image on the other surface (the back surface, for example). Thus, the card C inserted from the insertion slot 2b passes through the first path V1 composed of the path 101 and path 102, and is discharged from the discharge slot 2a2 after the image reading sensor 18 (the first and second image reading sensors 18a and 18b) has read the image(s) on at least one of the surfaces. Because the first path V1 is formed to be approximately horizontal from the insertion slot 2b to the discharge slot 2a1, it is possible to smoothly transport the card C, even when thick, thereby being less likely to cause a card jam.

Figure 3B:
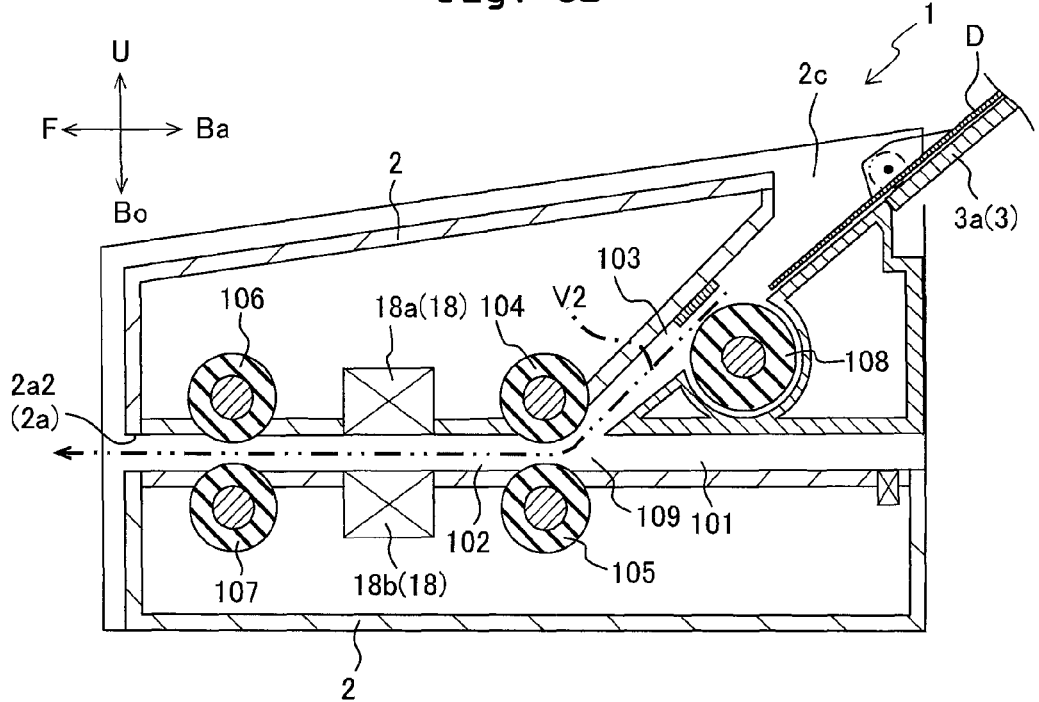
FIG. 3B is a schematic cross-sectional view of the CDS along the line IIIB-IIIB of FIG. 2.

FIG. 3B shows a cross-sectional view of the CDS 1 with the cover 3 being opened. The main body 2 is provided with the insertion slot 2c for inserting the document D, and the insertion slot 2c is exposed to be usable when the cover 3 is opened. In this manner, the CDS 1 in this embodiment is configured to be capable of reading the document D inserted from the insertion slot 2c with the cover 3 (the first and second covers 3*a* and 3*b*) being opened. The main body 2 is provided therein with a path 103 extending from the insertion slot 2*c*, and the path 103 is linked to the path 102. As shown in FIG. 3B, the path 103 for documents, and the aforementioned path 101 for cards are joined together at a junction portion 109, and connected respectively to the path 102. That is, the path 102 is a shared transport path to transport both the document D and the card C.

A paper feed roller 108 is provided at the path 103. The paper feed roller 108 is rotated by the driving motor 19 (see FIG. 4) to guide the document D loaded on the cover 3 functioning as the paper feed tray into the path 103 with the rotary force. The document D guided into the path 103 is nipped by the transport rollers 104 and 105, and transported toward the discharge slot 2*a*2 (discharge slot 2*a*) by the rotation of the transport rollers 104 and 105. Next, the document D transported by the transport rollers 104 and 105 is nipped by the paper discharge rollers 106 and 107, and discharged from the discharge slot 2*a*2 by the rotation of the paper discharge rollers 106 and 107. Thus, the document D inserted from the insertion slot 2*c* passes through the second path V2 composed of the path 103 and path 102, and is discharged from the discharge slot 2*a*2 after the image reading sensor 18 (the first and second image reading sensors 18*a* and 18*b*) has read the image(s) on at least one of the surfaces.

Figure 4:
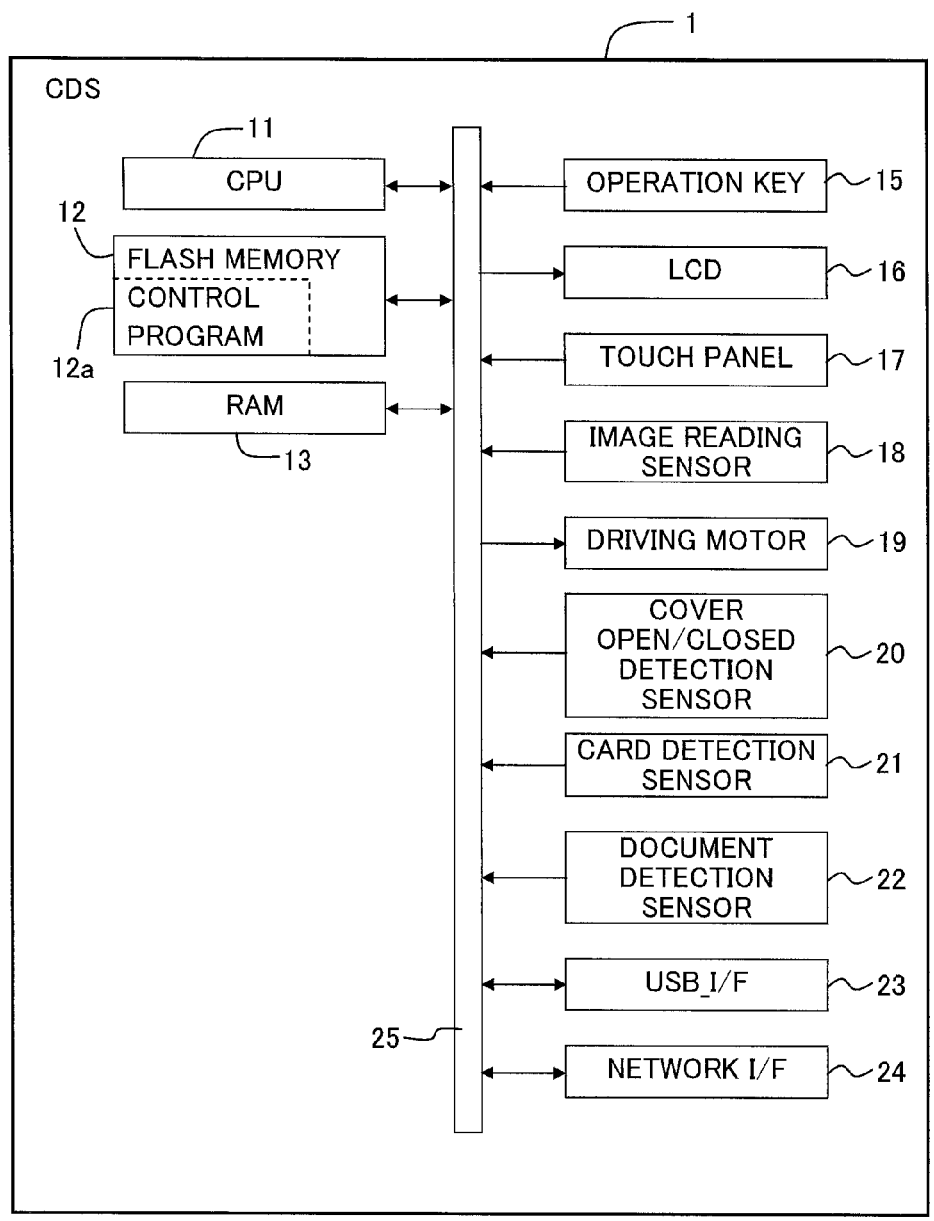
FIG. 4 is a block diagram showing an electrical configuration of the CDS.

As shown in FIG. 4, the CDS 1 is provided primarily with a CPU 11, a flash memory 12, a RAM 13, the operation key 15, the LCD 16, the touch panel 17, the image reading sensor 18, the driving motor 19, a cover open/closed detection sensor 20, the card detection sensor 21, a document detection sensor 22, a USB interface (referred to as a USB_I/F) 23, and a network interface (referred to as a network I/F) 24. The portions 11 to 13 and the portions 15 to 24 are mutually connected via a bus line 25.

Figure 11A:
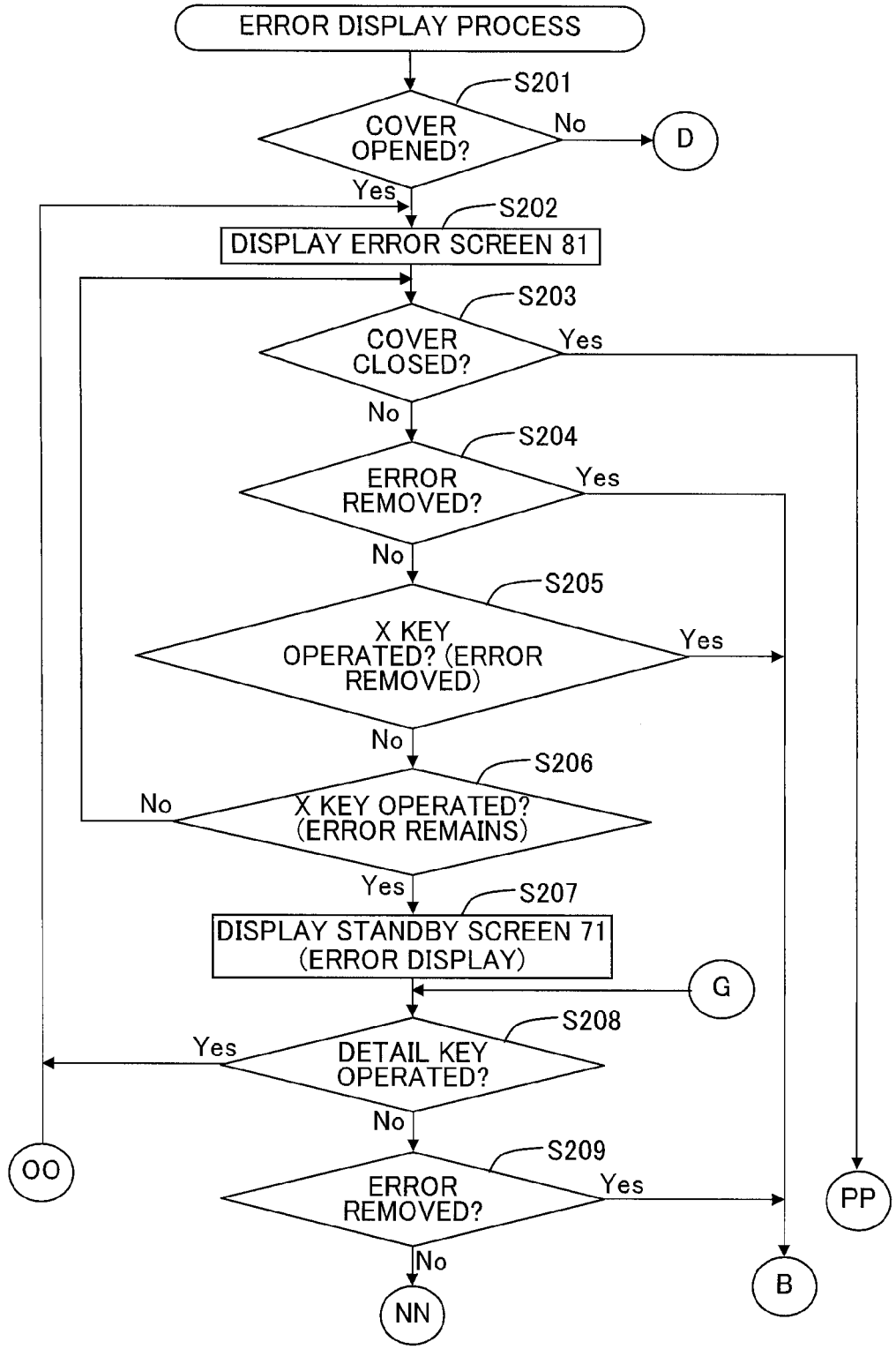
FIGS. 11A and 11B show a flowchart showing an error display process.
Figure 11B:
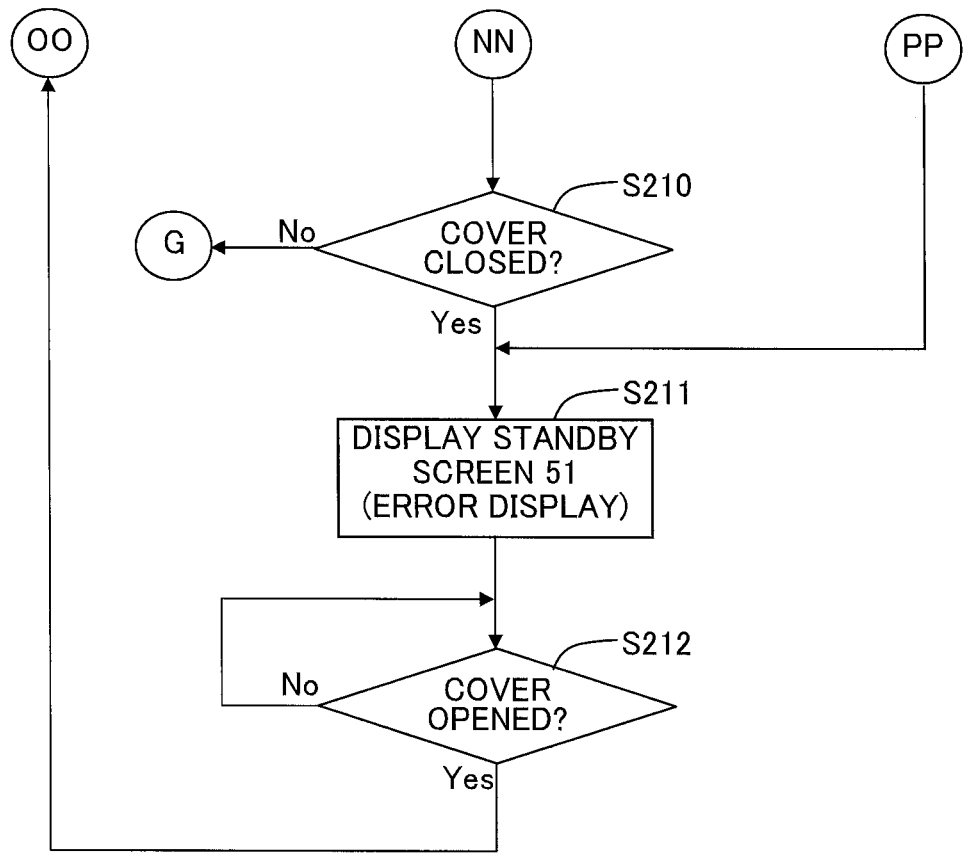
Figure 12A:
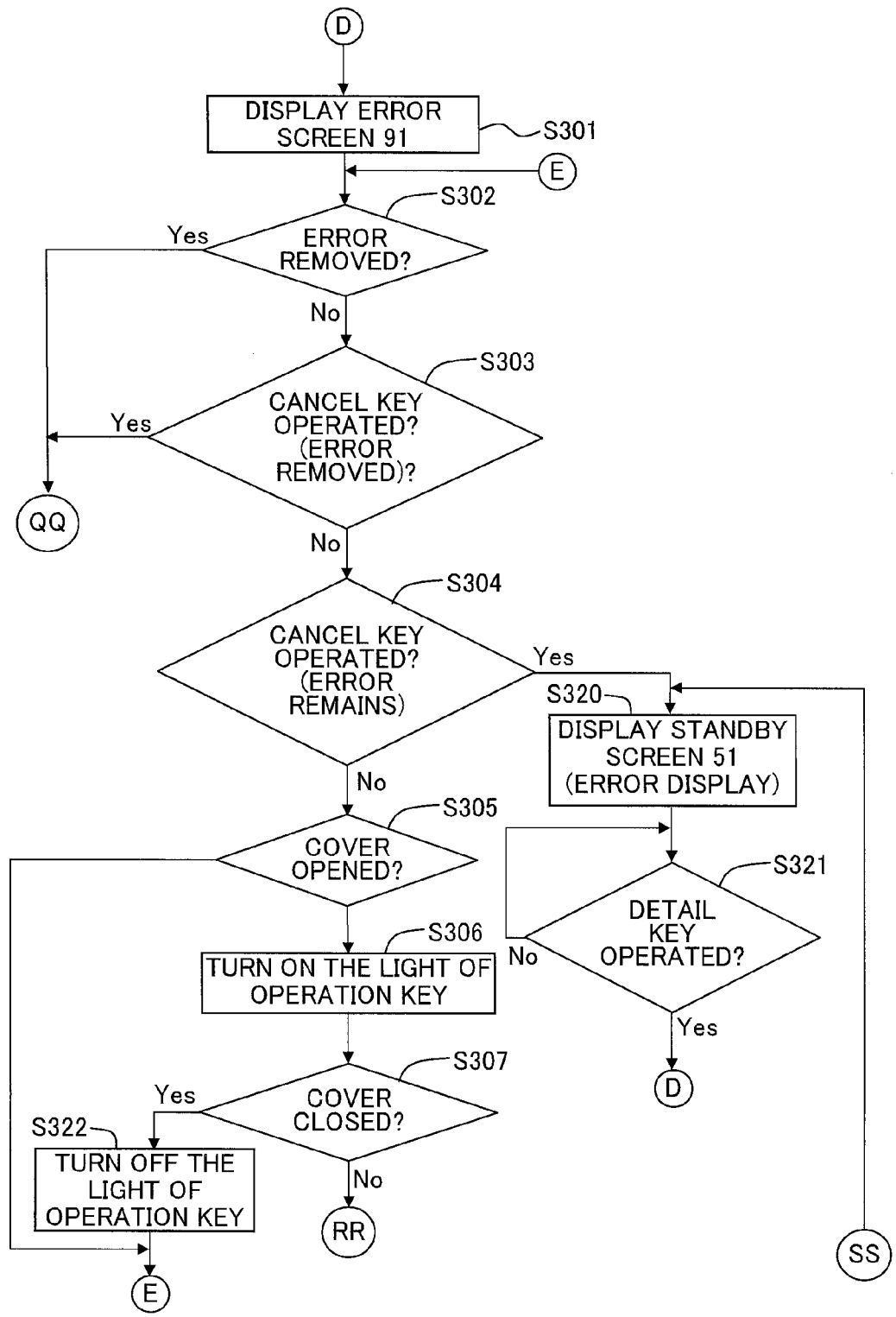
Figure 12B:
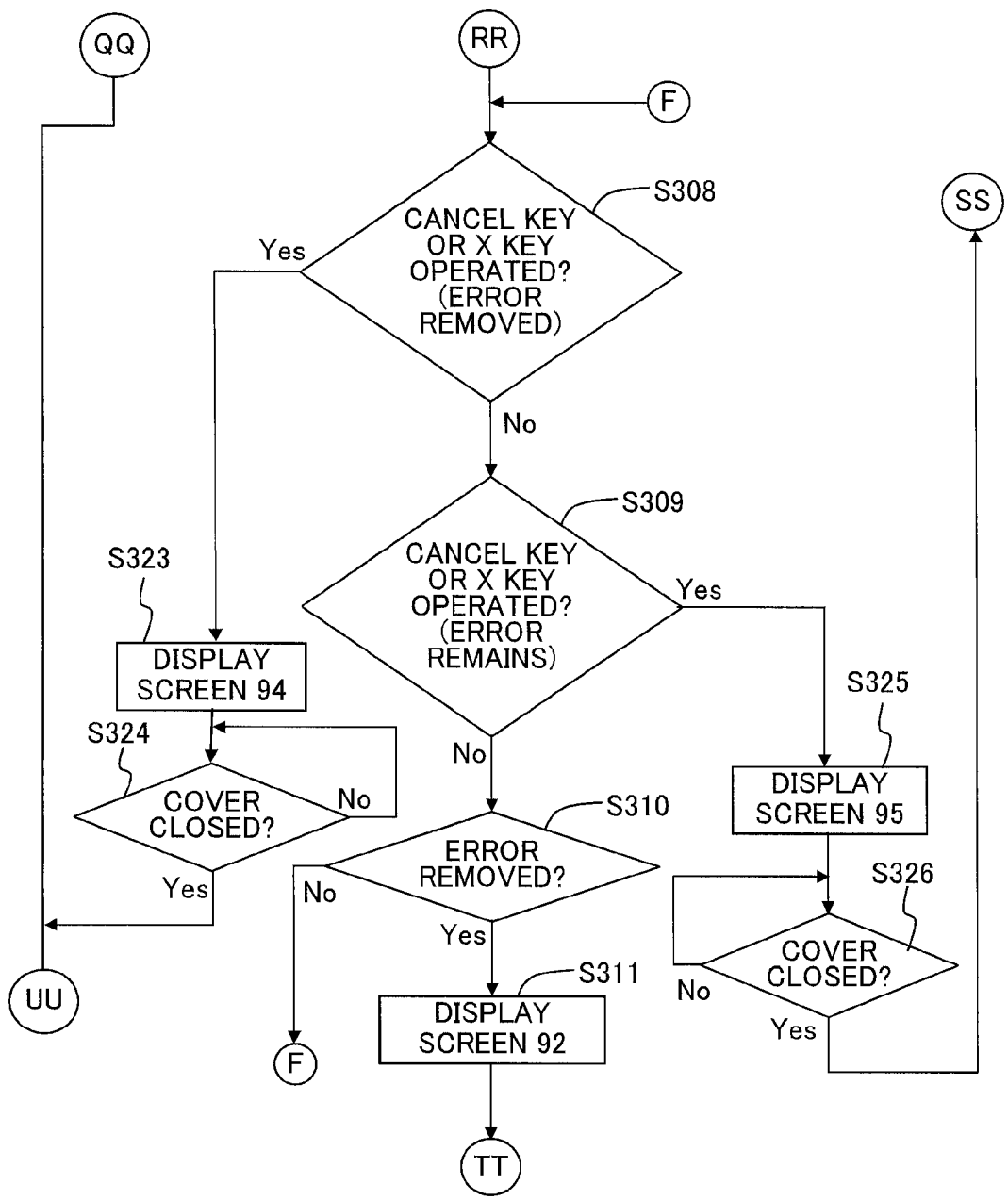

The CPU 11 controls each portion of the CDS 1 according to some fixed values and programs stored in the flash memory 12, and some data stored in the RAM 13. The flash memory 12 is a nonvolatile memory to store a control program 12*a* controlling the operation of the CDS 1, and reading set values and the like such as the reading resolution which has been set, etc. Further, according to the control program 12*a*, the CPU 11 carries out a display control for each aftermentioned screen shown in the screen transition diagrams of FIGS. 5 to 9, and each aftermentioned process shown in the flowcharts of FIGS. 10 to 12. For example, according to the control program 12*a*, the CPU 11 sets a manuscript reading mode corresponding to whether the cover 3 is opened or closed. In particular, when the cover 3 is closed, then the CPU 11 sets the manuscript reading mode to be a card reading mode for reading the card C inserted from the insertion slot 2*b*, whereas when the cover 3 is opened, then the CPU 11 sets the manuscript reading mode to be a document reading mode for reading the document D inserted from the insertion slot 2*c*. The RAM 13 is a rewritable volatile memory temporarily storing necessary information for the processing of the CPU 11. The RAM 13 stores the read image data read by the image reading sensor 18.

The operation key 15 is a hardware key provided to input various set values, instructions and the like to the CDS 1. The operation key 15 includes the Back key 15*a*, Home key 15*b*, and X key 15*c*. The LCD 16 is a liquid crystal display device. The touch panel 17 is provided to input instructions and the like to the CDS 1 by causing something for giving the instructions such as a finger, stick or the like to contact with or approach the touch panel 17. The image reading sensor 18 (the first image reading sensor 18*a* and second image reading sensor 18*b*) is provided to read an image by optically detecting the gray scale of the image. As the image reading sensor 18, it is possible to adopt a well-known sensor such as a CIS (Contact Image Sensor), a CCD (Charge Coupled Device), or the like. The driving motor 19 is provided to apply a driving force to rotate each of the rollers 104 to 108. The USB_I/F 23 is constructed by a well-known device for communicably connecting, via a USB plug, other devices, e.g., storage media such as USB memory and the like, personal computers (PC), hard disks, etc. The network_I/F 24 is provided for connecting the CDS 1 to a network (not shown) such as a LAN, the Internet, or the like.

The cover open/closed detection sensor 20 is provided to detect the opening and closing states of the cover 3, and output a signal to the CPU 11 according to whether the cover 3 is opened or closed. For example, when the cover 3 is closed, then the cover open/closed detection sensor 20 outputs a high-level signal to the CPU 11. Based on the signal inputted from the cover open/closed detection sensor 20, the CPU 11 determines the opening or closing state of the cover 3. As the cover open/closed detection sensor 20, it is possible to adopt a well-known sensor such as an optical sensor, contact-type sensor, magnetic sensor, or the like. The card detection sensor 21 is provided to detect the card C inserted into the insertion slot 2*b*. The card detection sensor 21 can adopt a well-known sensor such as an optical sensor or the like. The card detection sensor 21 outputs a detection signal to the CPU 11; the detection signal switches, for example, from a low level to a high level when detecting that the card C is inserted into the insertion slot 2*b*. Based on the signal inputted from the card detection sensor 21, the CPU 11 determines that the card C has been inserted. The document detection sensor 22 is provided to detect the document D loaded on the opened cover 3 serving as the paper feed tray. The document detection sensor 22 can adopt a well-known sensor such as a contact-type sensor or the like and, for example, outputs a high-level signal to the CPU 11 when the document D is loaded on the paper feed tray. Based on the signal inputted from the document detection sensor 22, the CPU 11 determines that the document D has been loaded on the paper feed tray.

As described above, having the above configuration in this embodiment, the CDS 1 is configured as a scanner to read the card C inserted from the insertion slot 2*b* and transported through the first path V1 with the cover 3 being closed, and to read the document D inserted from the insertion slot 2*c* and transported through the second path V2 with the cover 3 being opened. This CDS 1 is configured to display screens capable of carrying out a particular function related to reading the manuscript transported through a transport path according to the opening or closing state of the cover 3, i.e., according to the transport path of the manuscript to be read.

Figure 5:
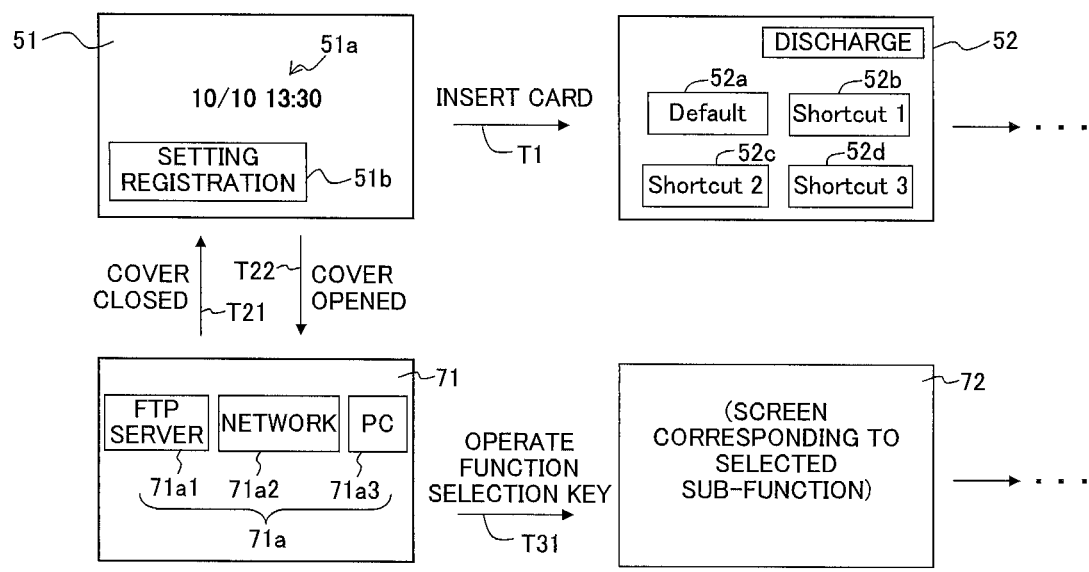
FIG. 5 is an example of a screen transition diagram of screens displayed on an LCD of the CDS.

FIG. 5 is an example of a screen transition diagram of screens displayed on the LCD 16 of the CDS 1. When in a standby state waiting to carry out the function of reading the card C or the document D, the CPU 11 of the CDS 1 causes different standby screens to be displayed according to the opening and closing states of the cover 3. In particular, in the standby state, the CPU 11 causes a standby screen 51 to be displayed when the cover is closed (T21). The standby screen 51 is the uppermost screen of the screen group of a tree structure related to reading the card C. The standby screen 51 displays a date-time display 51*a* showing the current date and time, and a setting registration key 51*b*. The setting registration key 51*b* is a software key for displaying a screen 56 (see FIG. 7) which is one of the setting screens for setting the reading set values related to reading the card C.

With the standby screen 51 being displayed, when the CPU 11 determines that the card C has been inserted into the insertion slot 2b based on the signal inputted from the card detection sensor 21 (T1), then the CPU 11 causes a screen 52 to be displayed instead of the standby screen 51. The screen 52 is a screen for letting the user designate reading set values related to reading the card C by the image reading sensor 18 (a scan setting designation screen). The screen 52 displays a default key 52a, and three shortcut keys 52b to 52d. Each of the default key 52a, and shortcut keys 52b to 52d is a software key capable of designating the scan setting constituted by a combination of a plurality of reading set values. The default key 52a is associated with a default scan setting. On the other hand, the shortcut keys 52b to 52d are each associated with a scan setting which is arbitrarily preset by the user. By carrying out an input operation (a touch operation in this embodiment) with any of the default key 52a and shortcut keys 52b to 52d, the user can designate the scan setting. When the CPU 11 accepts the input operation with any of the default key 52a and shortcut keys 52b to 52d, then the CPU 11 causes the screen corresponding to the input-manipulated key, in the screen group of the tree structure related to reading the card C, to be displayed instead of the screen 52. Generally, because reading the card C has a limited usage, even when the screen 52 is displayed as a subordinate screen the standby screen 51, including the keys 52a to 52d for designating the scan setting prepared beforehand by default or by the user, it is usually still sufficient with the scan setting prepared beforehand. Thus, after the card C is inserted into the insertion slot 2b, without carrying out the scan setting for the card C, it is possible to suppress the number of processes for the user to carry out until the reading of the inserted card C takes place.

On the other hand, in the standby state, the CPU 11 causes another standby screen 71 to be displayed when the cover is opened (T22). The standby screen 71 is the uppermost screen of the screen group of a tree structure related to reading the document D. The standby screen 71 displays a function selection key 71a. The function selection key 71a is provided for selecting a sub-function used with the function of reading the manuscript transported through the second path V2 (corresponding to the document D in this embodiment), and composed of as many constituent keys as the number of usable sub-functions. In the example shown in FIG. 5, the standby screen 71 displays three function selection keys 71a1 to 71a3 as the function selection key 71a. The function selection key 71a may be displayed either with all its constituent keys on the standby screen 71 simultaneously, or with some of them on the standby screen 71 to switch appropriately with the other according to a predetermined operation.

In the example shown in FIG. 5, the function selection key 71a1 is a software key corresponding to a function of uploading the read image data of the document D (to be referred to below as "document image data") to an FTP server; the function selection key 71a2 is a software key corresponding to a function of uploading the document image data to a cloud server on the network; and the function selection key 71a3 is a software key corresponding to a function of storing the document image data in a personal computer connected to the CDS 1. Further, with the CDS 1 in this embodiment, the function of uploading the read image data to a cloud server on the network is supposed to be a function which is not usable in the function of reading the card C being likely to include personal information, i.e., not usable in the function of reading the manuscript transported through the first path V1. By carrying out a touch operation with the function selection key 71a corresponding to a desired sub-function, the user is able to select any sub-function of the CDS 1.

With the standby screen 71 being displayed, when the CPU 11 accepts an input operation with the function selection key 71a (T31), then the CPU 11 causes a screen 72 to be displayed instead of the standby screen 71, in accordance with the sub-function corresponding to the input-manipulated function selection key 71a. For example, when the input operation is carried out with the function selection key 71a1, then as the screen 72, the LCD 16 displays a screen capable of designating an FTP server as the uploading destination, and setting the reading resolution, file format for storage, file name, and the like. When the CPU 11 accepts an input operation on the screen 72, then the CPU 11 causes the screen corresponding to the input operation, in the screen group of the tree structure related to reading the document D, to be displayed instead of the screen 72.

According to the CDS 1 in this embodiment as described above, a screen group of a tree structure is displayed according to the transport path switchable at the time of reading the manuscript by opening or closing the cover 3. When the usable sub-functions differ with whether the transport path is the first path V1 or the second path V2, when the usable sub-functions are not explicit with each transport path, then it is difficult for the user to use each sub-function. However, with the CDS 1 in this embodiment, because a screen group of a tree structure is displayed according to the transport path, it is possible to explicitly display the usable sub-functions according to the transport path. For example, the standby screen 71 displays the function selection key 71a2 corresponding to a function which is not usable in the function of reading the card C. Thus, when reading the document D, having clearly realized that the document image data can be uploaded to a cloud server, the user is able to select that function, whereby each sub-function is easy to use. On the other hand, the standby screen 51 does not display any key corresponding to the function selection key 71a2. Further, any screen of the screen group of the tree structure related to reading the card C also does not display any key corresponding to the function selection key 71a2. That is, in the screen group of the tree structure related to reading the card C, although there is also a screen which displays the keys for selecting the sub-functions used in the function of reading the manuscript transported through the first path V1 (i.e., the card C in this embodiment), that screen still does not display any key corresponding to the function selection key 71a2. Thus, when reading the card C, because it is possible to prevent the user from selecting any function not usable in reading the card C, in this respect, each sub-function is also easy for the user to use. Further, when there is any sub-function which is usable in the function of reading the manuscript transported through the first path V1, but not usable in the function of reading the manuscript transported through the second path V2, then in the screen group of the tree structure related to reading the card C, there is a screen which displays a key for selecting that particular sub-function, whereas that key is not displayed on any screen of the screen group of the tree structure related to reading the document D.

Figure 6:
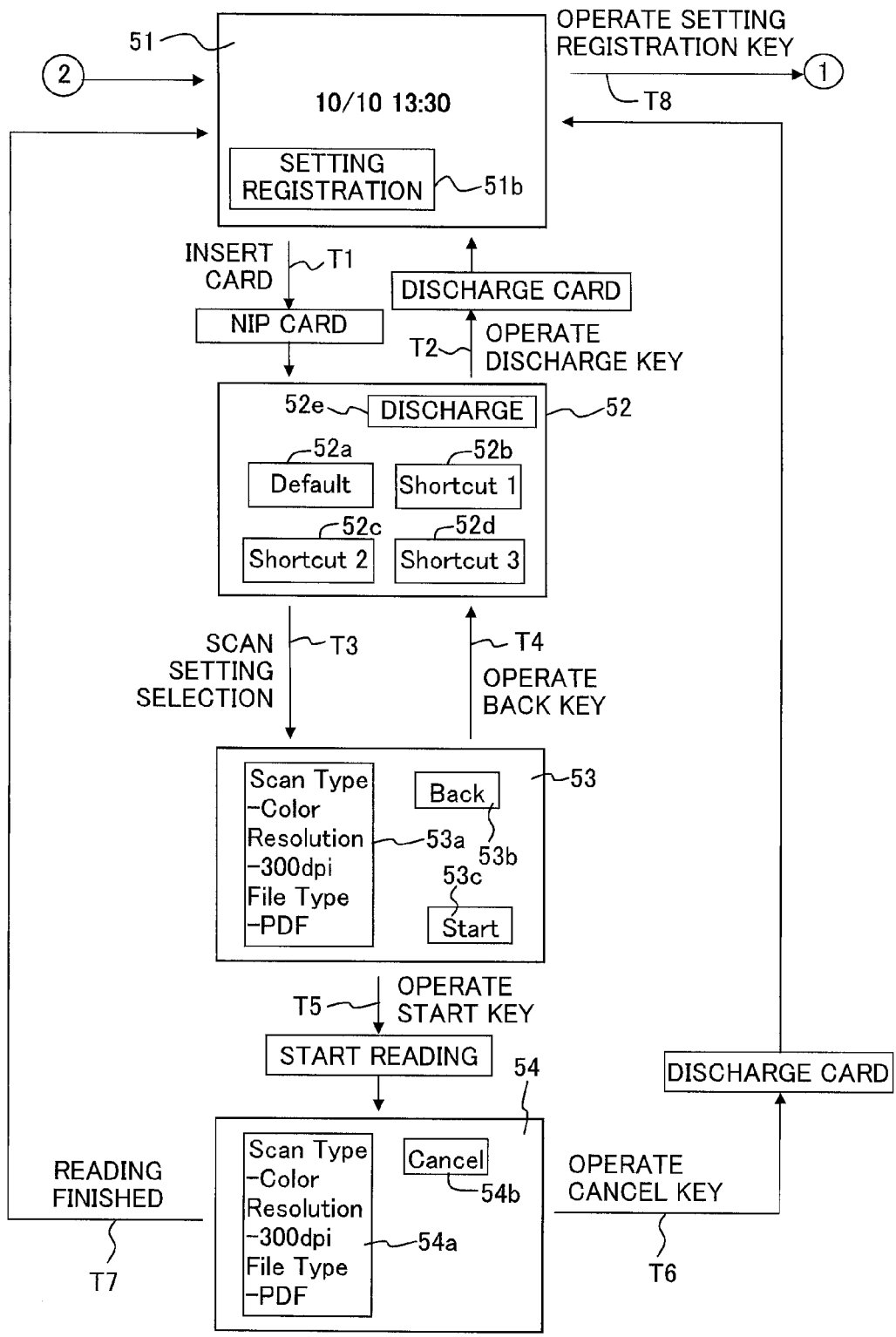
FIG. 6 is another example of the screen transition diagram of screens displayed on the LCD of the CDS.
Figure 7:
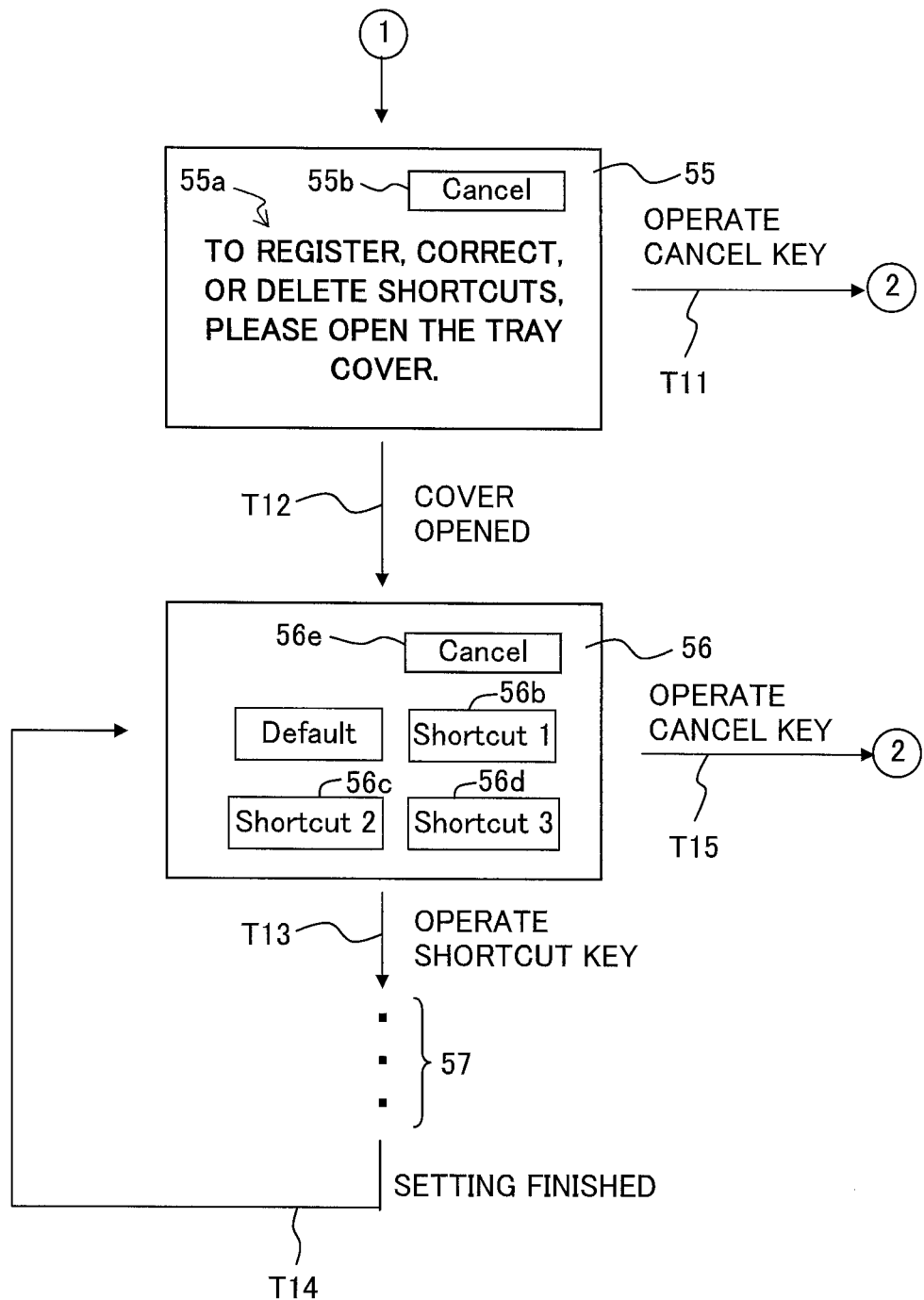
FIG. 7 is still another example of the screen transition diagram of screens displayed on the LCD of the CDS.

Each of the screens 51 to 57 shown in FIGS. 6 and 7 is included in the screen group of the tree structure related to reading the card C. Further, FIGS. 6 and 7 show a process, as necessary, related to a manuscript transport control carried out by the CPU 11. With the standby screen 51 being displayed, when the CPU 11 determines that the card C has been inserted into the insertion slot 2b (T1), then the CPU 11 causes the driving motor 19 to operate, and then causes the same to stop the operation with the inserted card C being nipped between the transport rollers 104 and 105. In the card reading mode, the function of reading the card C is started by such a trigger as that the insertion of the card C is detected by the card detection sensor 21. Thus, when the card C is nipped between the transport rollers 104 and 105, then the CPU 11 causes the screen 52 to be displayed instead of the standby screen 51. On the other hand, when the CPU 11 accepts a touch operation with the setting registration key 51b (T8), then the CPU 11 causes a screen 55 (see FIG. 7) to be displayed instead of the standby screen 51.

The screen 52, which is the scan setting screen, displays a discharge key 52e other than the aforementioned keys 52a to 52d. The discharge key 52e is another software key for instruction of discharging the card C being nipped between the transport rollers 104 and 105. When the CPU 11 accepts a touch operation with the discharge key 52e (T2), then the CPU 11 causes the driving motor 19 to operate, so as to discharge the card C being nipped between the transport rollers 104 and 105 from the discharge slot 2a1. When determining that the card C is discharged from the discharge slot 2a1, the CPU 11 causes the standby screen 51 to be displayed instead of the screen 52.

On the other hand, when the CPU 11 accepts a touch operation with the default key 52a, or a key associated with the scan setting among the shortcut keys 52b to 52d (T3), then the CPU 11 causes a screen 53 to be displayed instead of the screen 52. The screen 53 is provided for the user to confirm the scan setting designated by himself or herself (i.e., the screen before carrying out a scan). A display area 53a is provided in the screen 53. In the display area 53a, there are displayed the contents of the scan setting designated by the user for the default key 52a, and the shortcut keys 52b to 52d.

The screen 53, which is the screen before carrying out a scan, displays a Back key 53b and a Start key 53c. The Back key 53b is a software key for instruction of displaying the previous screen 52 instead of the screen being currently displayed (i.e., the screen 53). When the CPU 11 accepts a touch operation with the Back key 53b (T4), then the CPU 11 causes the screen 52 to be displayed instead of the screen 53. The Start key 53c is another software key for instructing the image reading sensor 18 to carry out the reading of the card C. When the CPU 11 accepts a touch operation with the Start key 53c (T5), then the CPU 11 causes the driving motor 19 to operate, so as to transport the card C being nipped between the transport rollers 104 and 105 to the downstream side, and let the image reading sensor 18 start reading the card C. Along with the start of reading the card C, the CPU 11 causes a screen 54 to be displayed instead of the screen 53.

The screen 54 is a screen displayed in carrying out the reading of the card C (i.e., the screen in carrying out a scan). A display area 54a is provided in the screen 54. In the display area 54a, there are displayed the contents of the scan setting made for the reading being currently carried out. The screen 54 displays a Cancel key 54b, which is a software key for instruction of ceasing or canceling the reading being currently carried out. When the CPU 11 accepts a touch operation with the Cancel key 54b (T6), then the CPU 11 causes the image reading sensor 18 to cease reading the card C, and causes the card C to be discharged from the discharge slot 2a1. After accepting the touch operation with the Cancel key 54b, when determining that the card C has been discharged from the discharge slot 2a1, the CPU 11 causes the standby screen 51 to be displayed instead of the screen 54. On the other hand, When finished with the reading started by touching the Start key 53c (T7), the CPU 11 also causes the standby screen 51 to be displayed instead of the screen 54.

The screen 55 shown in FIG. 7 displays a message 55a suggesting that the cover 3 be opened. The screen 55 also displays a Cancel key 55b. When the CPU 11 accepts a touch operation with the Cancel key 55b (T11), then the CPU 11 causes the standby screen 51 to be displayed instead of the screen 55. On the other hand, with the screen 55 being displayed, when the CPU 11 determines, based on the signal inputted from the cover open/closed detection sensor 20, that the cover 3 is opened (T12), then the CPU 11 causes the screen 56 to be displayed instead of the screen 55. When the screen 55 is being displayed, because the CDS 1 is in the standby state, normally the standby screen 71 should be displayed due to the opening of the cover 3. According to the CDS 1 in this embodiment, however, the screen 56 is displayed which is one screen included in the screen group of the tree structure related to reading the card C. That is, according to the CDS 1 in this embodiment, subject to the condition that a touch operation has been made with the setting registration key 51b displayed in the standby screen 51, even when the cover 3 is opened, it is configured not to display any screen included in the screen group of the tree structure related to reading the document D.

The screen 56 is a screen (a shortcut setting screen) which functions as a window for the user to carry out registration of an arbitrary scan setting for the shortcut keys 52b to 52d in the screen 52 (see FIG. 6). The screen 56 is configured to be the same as the screen 52 except that a Cancel key 56e replaces the discharge key 52e. Thus, the screen 56 displays shortcut keys 56b to 56d. The shortcut keys 56b to 56d are software keys which function as triggers to start processes of registering the reading set values for the shortcut keys 52b to 52d, respectively. The Cancel key 56e is another software key for instruction of ceasing or ending the registration processes. When the CPU 11 accepts a touch operation with the Cancel key 56e (T15), then the CPU 11 causes the standby screen 51 to be displayed instead of the screen 56.

When the CPU 11 accepts a touch operation with any of the shortcut keys 56b to 56d (T13), then the CPU 11 causes screens 57 to be displayed for carrying out the registration processes. Further, in order to carry out the series of registration processes, a plurality of screens 57 are switched in display every time. While carrying out the series of registration processes, as necessary, the user can manipulate the Back key 15a to switch the display from any screen 57 back to the previous screen 57. In this manner, according to the CDS 1 in this embodiment, because it is possible to use the Back key 15a to switch back the display from any screen 57 while carrying out the series of registration processes, it is not necessary to display any software key corresponding to the Back key 15a in any of the screens 57. Because the LCD 16 has a limited displayable screen size, it is possible to effectively make use of the limited areas of the screens 57 without displaying any software key corresponding to the Back key 15a.

Thus, according to the CDS 1 in this embodiment, with the cover 3 being opened, it is possible to designate (register) the reading set values related to reading the card C. Therefore, it is possible to use the operation key 15, which is exposed only when the cover 3 is opened, for designating the reading set values related to reading the card C. It is also possible to use the operation key 15 composed of the Back key 15a and the like for registering the reading set values related to reading the document D in shortcut keys (not shown). In such case, because it is possible to configure the screens 57 as setting screens shared between the card C and the document D, it is possible to reduce the amount of image data for the CDS 1 to store.

Figure 8:
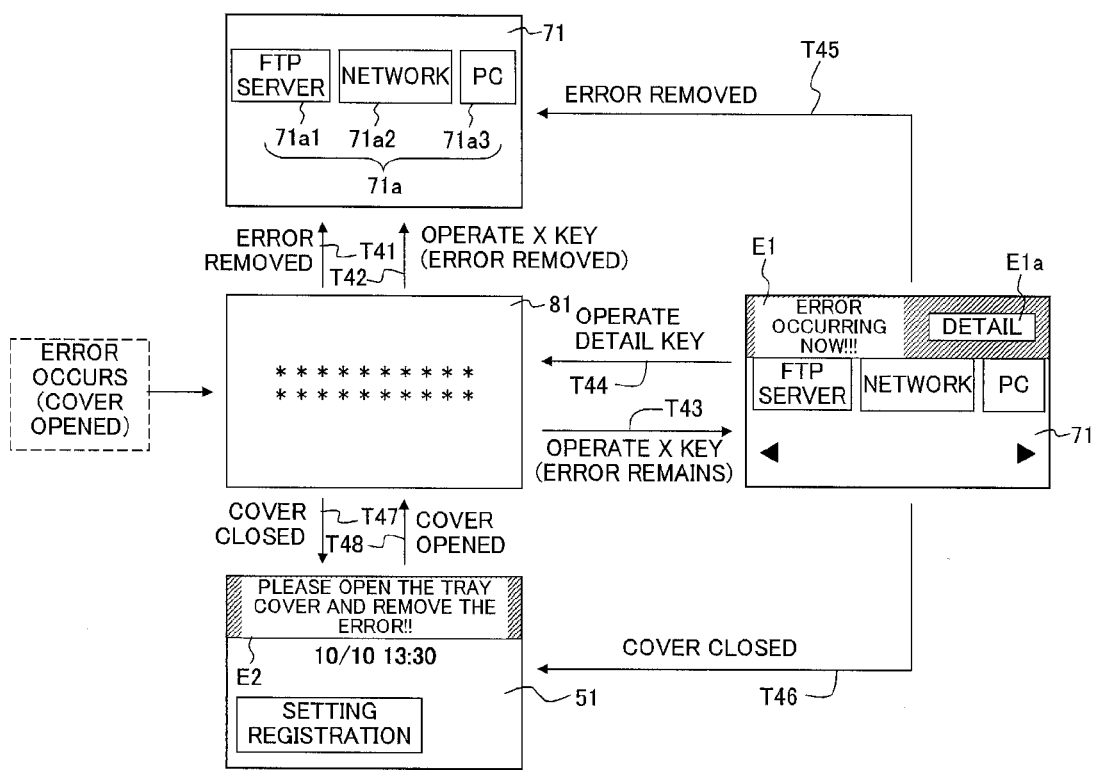
FIG. 8 is still another example of the screen transition diagram of screens displayed on the LCD of the CDS.
Figure 9A:
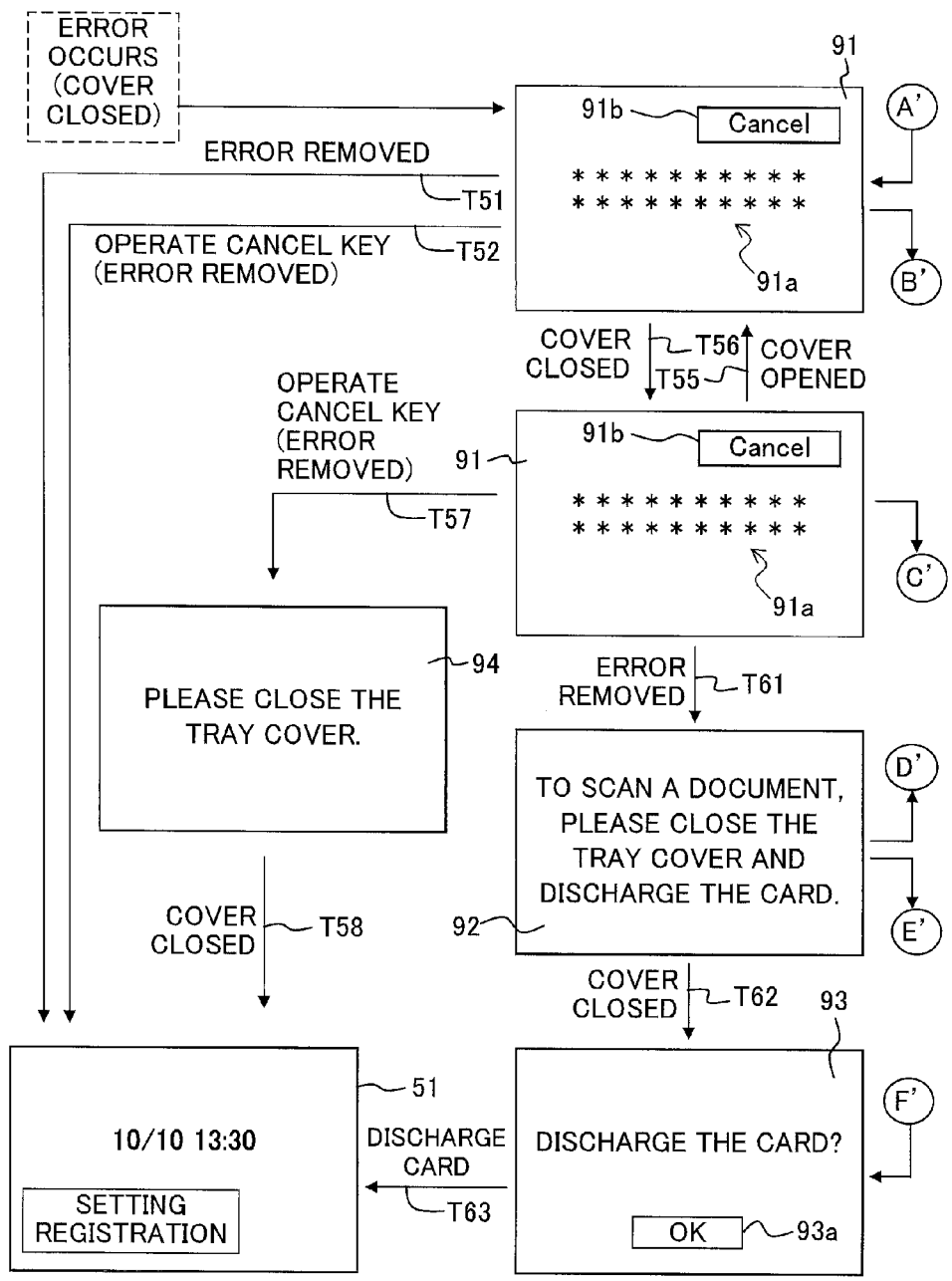
FIGS. 9A and 9B show still another example of the screen transition diagram of screens displayed on the LCD of the CDS.
Figure 9B:
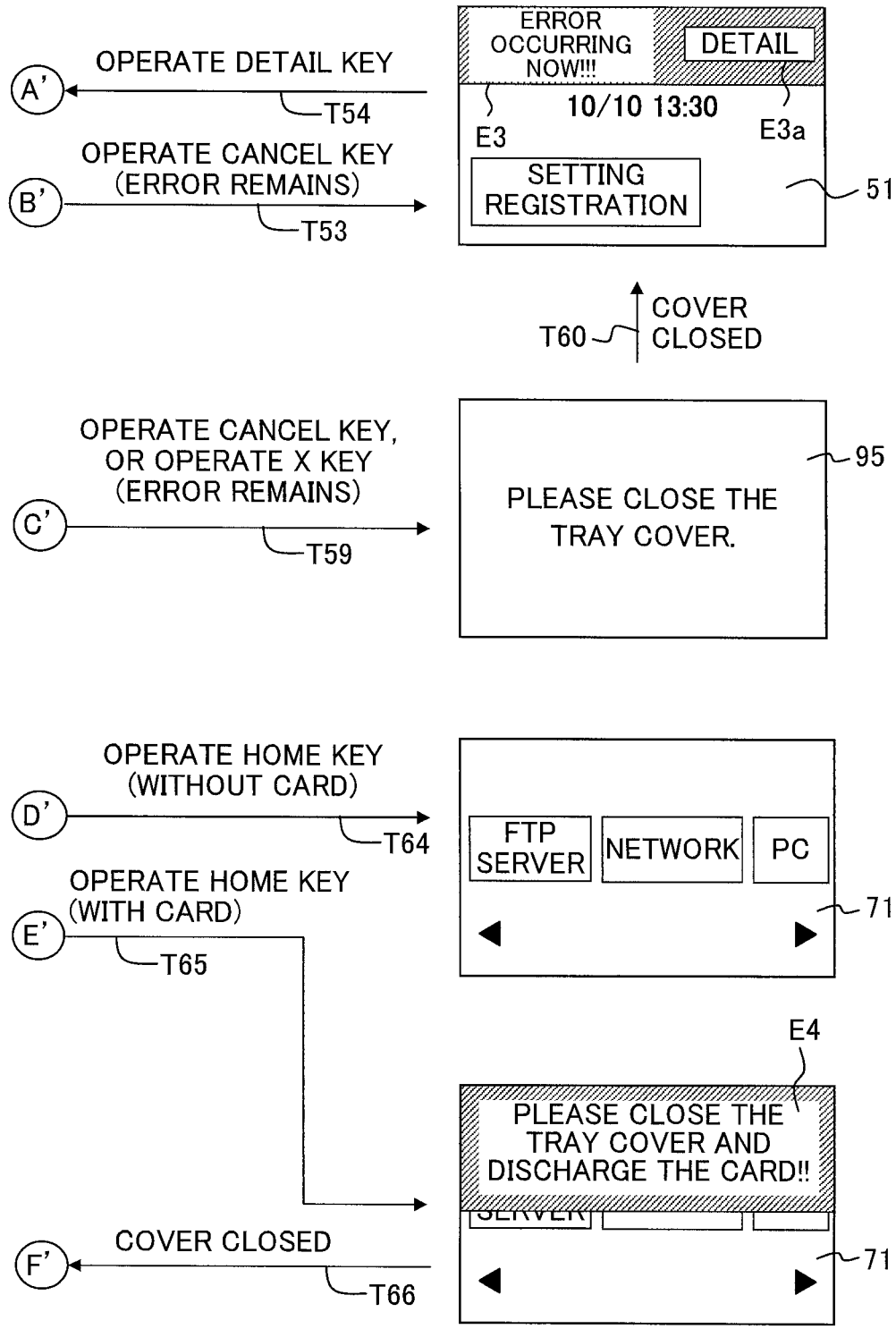

FIG. 8 is an example of the screen transition diagram when some error occurs with the cover 3 being opened. FIGS. 9A and 9B show another example of the screen transition diagram when some error occurs with the cover 3 being closed. As shown in FIG. 8, with the cover 3 being opened, when some error occurs, then the CPU 11 causes an error screen 81 to be displayed. The error screen 81 displays an error message 81a to show the content of the error. With the error screen 81 being displayed, when the CPU 11 detects that the user has manually removed the error (T41), then CPU 11 causes the normal standby screen 71 to be displayed instead of the error screen 81. Thus, in such case, the user is able to successively carry out a process of reading the document D. With the error screen 81 being displayed, when the present error is removed (T42) by carrying out the process based on the result that the CPU 11 has accepted a operation with the X key 15c which is a hardware key provided on the upper side of the main body 2, then the CPU 11 also causes the normal standby screen 71 to be displayed instead of the error screen 81.

On the other hand, when the present error is not removed but remains (T43) even though the CPU 11 has accepted the operation with the X key 15c, then the CPU 11 causes the standby screen 71 to be displayed instead of the error screen 81, the standby screen 71 now including an error display E1 which indicates that the error is occurring. Thus, when an error still remains even though the X key 15c is manipulated, because the screen including the error display E1 is displayed, the user is able to realize that the error is not removed by manipulating the X key 15c. The standby screen 71 including the error display E1 displays a detail key E1a. When the CPU 11 accepts a touch operation with the detail key E1a (T44), then the CPU 11 causes the LCD 16 to redisplay the error screen 81 instead of the standby screen 71 including the error display E1, so as to report the content of the remaining error to the user.

With the standby screen 71 including the error display E1 being displayed, when the CPU 11 detects that the user has manually removed the error (T45), then CPU 11 causes the normal standby screen 71 to be displayed instead of the standby screen 71 including the error display E1. On the other hand, with the standby screen 71 including the error display E1 being displayed, when the CPU 11 determines that the cover 3 is closed (T46), then CPU 11 causes the standby screen 51 to be displayed instead of the standby screen 71 including the error display E1, the standby screen 51 now including an error display E2 which suggests that the cover 3 be opened. Further, with the error screen 81 being displayed, when the CPU 11 determines that the cover 3 is closed (T47), then CPU 11 also causes the standby screen 51 including the error display E2 to be displayed instead of the error screen 81. It is often necessary to remove an error occurring with the cover 3 being closed by manual work with the cover 3 being opened. Thus, with an error still remaining, when the cover 3 is closed, because the screen including the error display E2 is displayed, the user is able to realize that the error should be removed with the cover 3 being opened. With the standby screen 51 including the error display E2 being displayed, when the CPU 11 determines that the cover 3 is opened (T48), then CPU 11 causes the LCD 16 to redisplay the error screen 81 instead of the standby screen 51 including the error display E2.

As shown in FIGS. 9A and 9B, when some error occurs with the cover 3 being closed, then the CPU 11 causes an error screen 91 to be displayed. The error screen 91 displays an error message 91a showing the content of the error, and a Cancel key 91b. With the cover 3 being closed, and with the error screen 91 being displayed, when the CPU 11 detects that the user has manually removed the error (T51), then CPU 11 causes the normal standby screen 51 to be displayed instead of the error screen 91. Thus, in such case, the user is able to successively carry out the process of reading the card C.

The Cancel key 91b displayed in the error screen 91 is a software key which has the same function as the X key 15c used for removing an error occurring with the cover 3 being opened. With the cover 3 being closed, and with the error screen 91 being displayed, when the present error is removed (T52) by carrying out the process based on the result that the CPU 11 has accepted a operation with the Cancel key 91b, then the CPU 11 also causes the normal standby screen 51 to be displayed instead of the error screen 91.

As described above, the CDS 1 in this embodiment has the X key 15c provided at a position covered by the cover 3 when the cover 3 is closed. Therefore, in the situation where the error screen 91 arises, that is, in the situation where some error occurs with the cover 3 being closed, it is not possible to manipulate the X key 15c without opening the cover 3. To deal with this situation, by letting the error screen 91 display a software key (the Cancel key 91b) which functions in the same manner as the X key 15c, the user becomes capable of removing the error without opening the cover 3, whereby it is possible to reduce the user's time and effort for removing the error. Further, because the error screen 91 displays the Cancel key 91b, when the cover 3 is closed, it is also not necessary to expose the X key 15c. Thus, the opening 3c of the cover 3 can be configured with the minimum size such as approximately the size equivalent to the LCD 16. In this manner, according to the CDS 1 in this embodiment, because it is possible to reduce the size of the opening 3c as much as possible, the strength of the cover 3 can be sufficiently secured. On the other hand, as described above, no software key corresponding to the error screen 91 is displayed in the error screen 81 which is displayed when some error occurs with the cover 3 being opened. Thus, no key with an equivalent function is repeatedly provided between the inside and the outside of the error screen 81, whereby it is possible to prevent giving any confusion to the user.

With the cover 3 being closed, and with the error screen 91 being displayed, when the present error is not removed but remains (T53) even though the CPU 11 has accepted the touch operation with the Cancel key 91b, then the CPU 11 causes the standby screen 51 to be displayed instead of the error screen 91, the standby screen 51 now including an error display E3 similar to the error display E1. Thus, from the screen including the error display E3, the user is able to realize that the error is not removed by manipulating the Cancel key 91b. The standby screen 51 including the error display E3 displays a detail key E3a. When the CPU 11 accepts a touch operation with the detail key E3a (T54), then the CPU 11 causes the error screen 91 to be redisplayed instead of the standby screen 51 including the error display E3.

With the error screen 91 being displayed, even when the CPU 11 determines that the cover 3 is opened (T55), the CPU 11 still maintains the display of the error screen 91. As described above, when some error occurs with the cover 3 being opened, then the error screen 81 is displayed without any software key corresponding to the Cancel key 91b. In order to remove the error, it is sometimes necessary to open the cover 3. However, when the cover 3 is opened with the error screen 91 being displayed, when the error screen 81 is displayed, then it just looks as when the Cancel key 91b is eliminated. Thereby, the user is liable to be confused by the misunderstanding that the error is removed because the Cancel key 91b is eliminated. To deal with this problem, according to the CDS 1 in this embodiment, even when the cover 3 is opened with the error screen 91 being displayed, because of maintaining the display of the error screen 91, it is still possible to prevent bringing about the confusion and misunderstanding. Likewise, with the cover 3 being opened, and with the error screen 91 being displayed, even when the CPU 11 determines that the cover 3 is closed (T56), the CPU 11 still maintains the display of the error screen 91.

With the cover 3 being opened, and with the error screen 91 being displayed, when the present error is removed (T57) by carrying out the process based on the result that the CPU 11 has accepted a operation with the Cancel key 91b, then the CPU 11 causes a screen 94 to be displayed instead of the error screen 91. The screen 94 displays a message which suggests that the cover 3 be closed. With the screen 94 being displayed, when the CPU 11 determines that the cover 3 is closed (T58), then the CPU 11 causes the normal standby screen 51 to be displayed instead of the screen 94. On the other hand, with the cover 3 being opened, and with the error screen 91 being displayed, when the present error is not removed but remains (T59) even though the CPU 11 has accepted the touch operation with the Cancel key 91b, then the CPU 11 causes a screen 95 similar to the screen 94 to be displayed. With the screen 95 being displayed, when the CPU 11 determines that the cover 3 is closed (T60), then the CPU 11 causes the standby screen 51 including the error display E3 to be displayed instead of the screen 95.

With the cover 3 being opened, and with the error screen 91 being displayed, when the CPU 11 detects that the user has manually removed the error (T61), then CPU 11 causes a screen 92 to be displayed instead of the error screen 91. The screen 92 displays a message which suggests that the cover 3 be closed to discharge the card C. With the screen 92 being displayed, when the CPU 11 determines that the cover 3 is closed (T62), then the CPU 11 causes a screen 93 to be displayed instead of the screen 92. The screen 93 is a confirmation screen provided to confirm whether or not to discharge the card C, and displays an OK key 93a for instruction of carrying out the discharge of the card C. When the CPU 11 determines that the card C is discharged from the discharge slot 2a1 after accepting a touch operation with the OK key 93a (T63), then the CPU 11 causes the normal standby screen 51 to be displayed instead of the screen 93.

With the screen 92 being displayed, when the CPU 11 accepts a operation with the Home key 15b, and determines that the card C is not inserted into the insertion slot 2b (T64), then the CPU 11 causes the normal standby screen 71 to be displayed instead of the screen 92. Thus, in such case, the user is able to successively carry out a process of reading the document D. On the other hand, with the screen 92 being displayed, when the CPU 11 accepts a operation with the Home key 15b, and determines that the card C is inserted into the insertion slot 2b (T65), then the CPU 11 causes the standby screen 71 to be displayed instead of the screen 92, the standby screen 71 now including an error display E4 which suggests that the cover 3 be closed to discharge the card C. With the standby screen 71 including the error display E4 being displayed, when the CPU 11 determines that the cover 3 is closed (T66), then the CPU 11 causes the screen 93 to be displayed instead of the standby screen 71 including the error display E4. Further, it is also possible to use different screens as the screen 92 between the case with the card C being not discharged but left as it is, and the case with the card C being not inserted. With the screen 92 displaying that the card C is not discharged but left as it is, when the CPU 11 carries out the processes of T62 and T64, then the CPU 11 may respectively cause the screen 93 and the normal standby screen 71 to be displayed instead of the present screen. On the other hand, with the screen 92 displaying that the card C is not inserted, when the CPU 11 carries out the process of T65, then the CPU 11 may cause the standby screen 71 including the error display E4 to be displayed instead of the present screen. Further, the Back key 15a may also be furnished with a function equivalent to that of the Home key 15b used with the screen 92 being displayed.

Figure 10A:
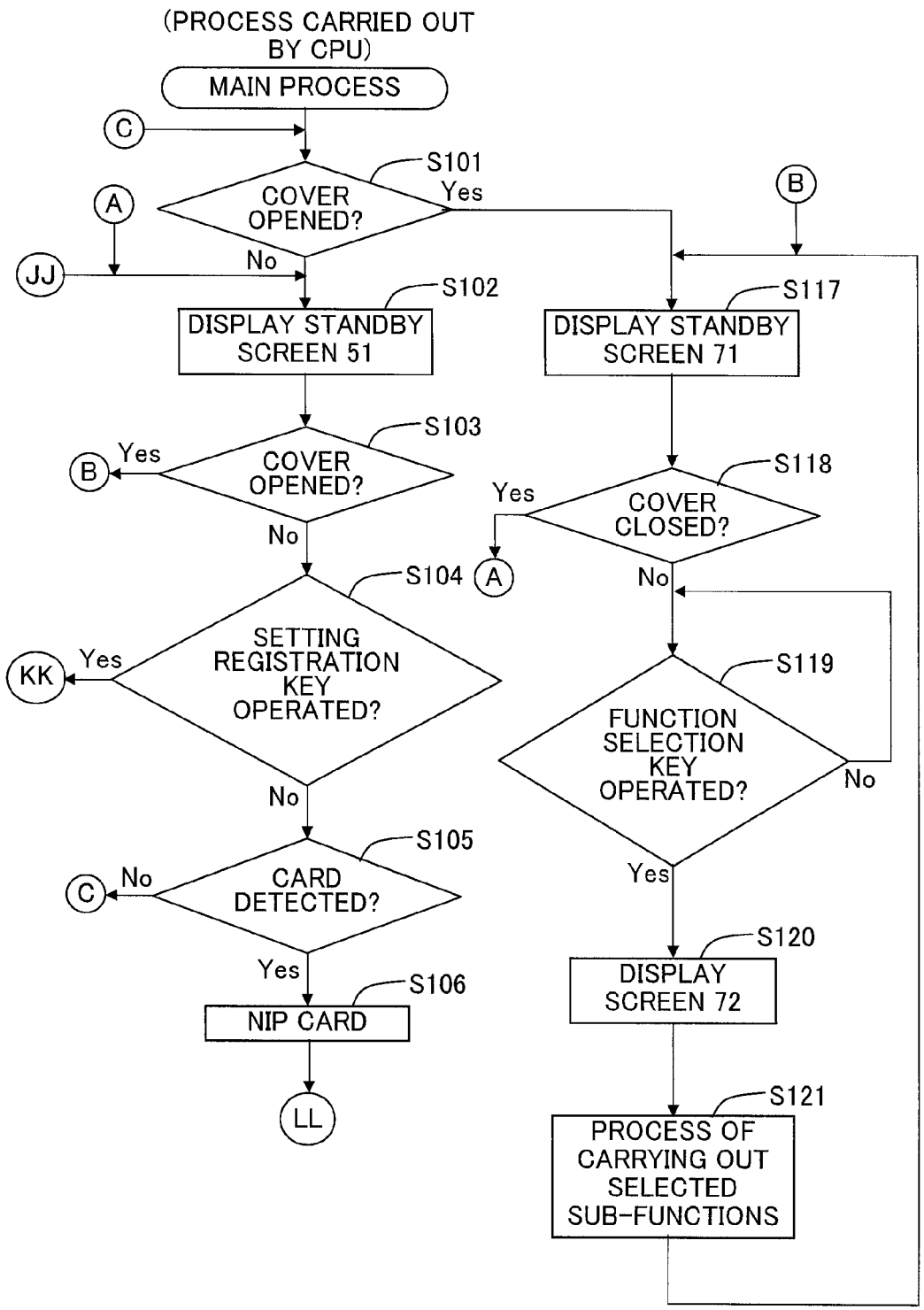
FIGS. 10A, 10B and 10C show a flowchart showing a main process.
Figure 10B:
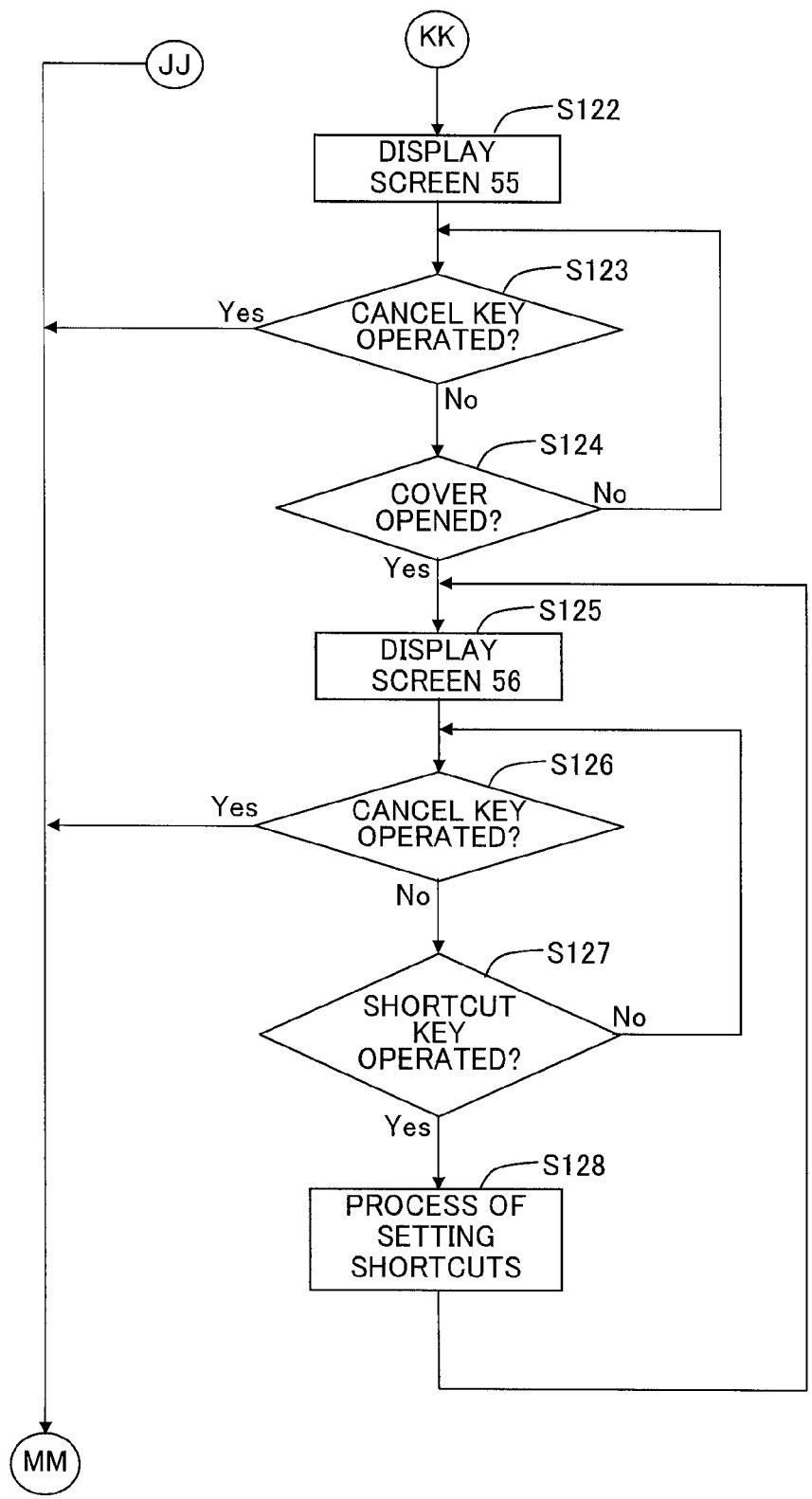
Figure 10C:
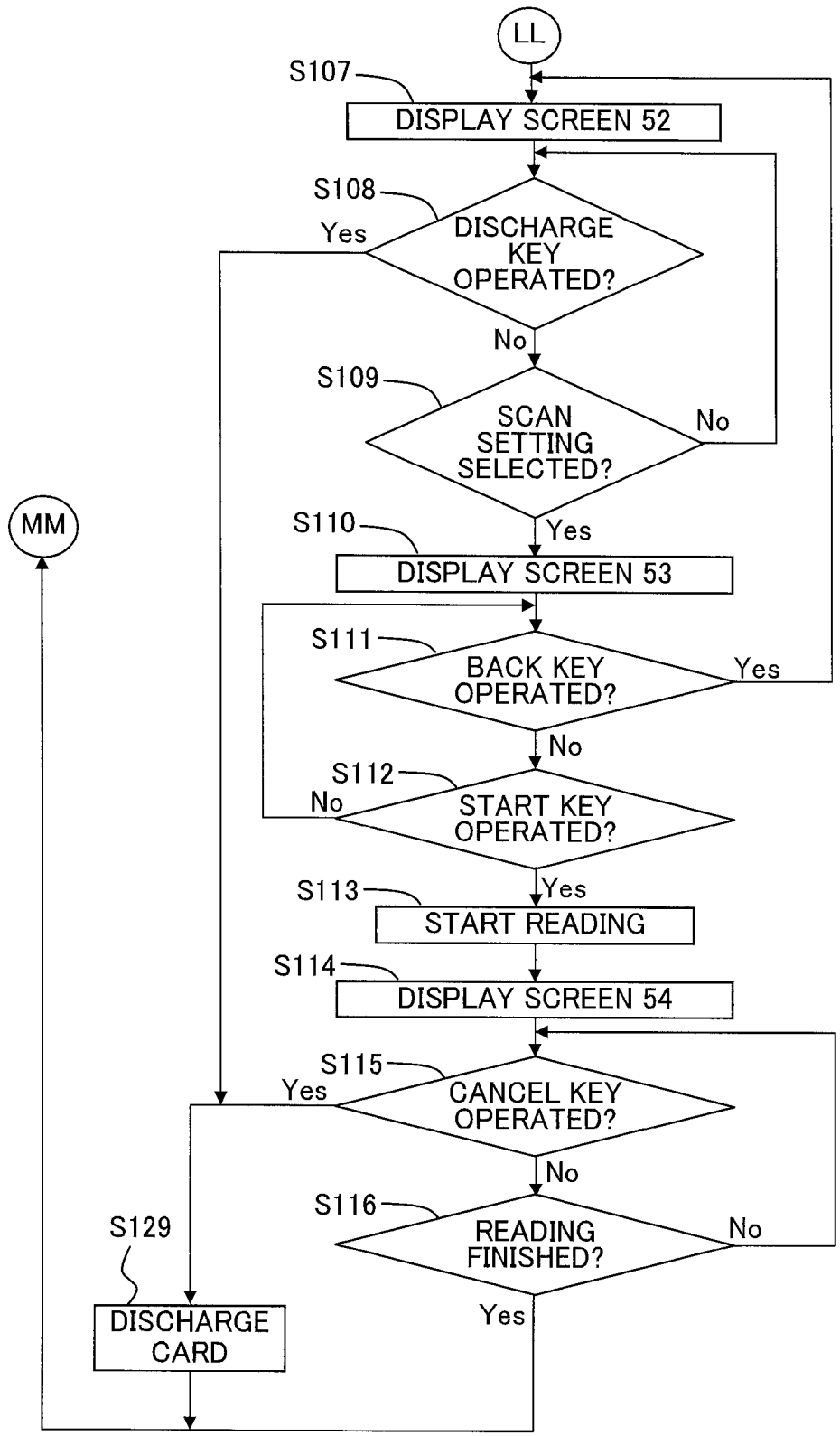

FIGS. 10A to 10C show a flowchart showing a main process carried out by the CPU 11 according to the control program 12a. This process is started on turning on the power to the CDS 1. First, when the CPU 11 determines, based on the signal inputted from the cover open/closed detection sensor 20, that the cover 3 is closed (S101: No), then it causes the LCD 16 to display the standby screen 51 (S102). On the other hand, when the CPU 11 determines that the cover 3 is opened (S101: Yes), then it causes the LCD 16 to display the standby screen 71 (S117).

With the standby screen 51 being displayed, when the CPU 11 determines that the cover 3 is opened (S103: Yes/corresponding to the aforementioned T22), then the CPU 11 shifts the process to S117. Thereby, the LCD 16 displays the standby screen 71 instead of the standby screen 51. On the other hand, with the standby screen 71 being displayed, when the CPU 11 determines that the cover 3 is closed (S118: Yes/corresponding to the aforementioned T21), then the CPU 11 shifts the process to S102. Thereby, the LCD 16 displays the standby screen 51 instead of the standby screen 71.

With the standby screen 51 being displayed, when the CPU 11 determines that the card C is inserted into the insertion slot 2b without accepting any touch operation with the setting registration key 51b (S103: No, S104: No, and S105: Yes/corresponding to the aforementioned T1), then the CPU 11 causes the driving motor 19 to operate, and then causes the same to stop the operation with the inserted card C being nipped between the transport rollers 104 and 105 (S106). Next, the CPU 11 causes the LCD 16 to display the screen 52 instead of the standby screen 51 (S107). On the other hand, when the CPU 11 does not determine, in S105, that the card C is inserted into the insertion slot 2b (S105: No), then the CPU 11 returns the process to S101.

With the screen 52 being displayed, when the CPU 11 accepts a touch operation with the discharge key 52e (S108: Yes/corresponding to the aforementioned T2), then the CPU 11 causes the driving motor 19 to operate so as to discharge, from the discharge slot 2a1, the card C being nipped between the transport rollers 104 and 105 (S129), and then returns the process to S102. Thereby, the LCD 16 displays the standby screen 51 instead of the screen 52. On the other hand, when the CPU 11 accepts a touch operation with any of the respective keys 52a to 52d (S108: No, and S109: Yes/corresponding to the aforementioned T3), then the CPU 11 causes the LCD 16 to display the screen 53 instead of the screen 52 (S110). Further, when the CPU 11 does not accept any touch operation with any of the respective keys 52a to 52e (S109: No), then the CPU 11 returns the process to S108, and stands by for a touch operation with any of the respective keys 52a to 52e.

With the screen 53 being displayed, when the CPU 11 accepts a touch operation with the Back key 53b (S111: Yes/corresponding to the aforementioned T4), then the CPU 11 returns the process to S107. Thereby, the LCD 16 displays the previous screen 52 instead of the screen 53. On the other hand, when the CPU 11 accepts a touch operation with the Start key 53c (S111: No, and S112: Yes/corresponding to the aforementioned T5), then the CPU 11 causes the driving motor 19 to operate so as to transport, to the downstream side, the card C being nipped between the transport rollers 104 and 105, and causes the image reading sensor 18 to start reading the card C (S113). Then, the CPU 11 causes the LCD 16 to display the screen 54 instead of the screen 53 (S114). On the other hand, when the CPU 11 does not accept any touch operation with any of the respective keys 53b and 53c (S112: No), then the CPU 11 returns the process to S110, and stands by for a touch operation with any of the respective keys 53b and 53c.

With the screen 54 being displayed, when the CPU 11 accepts a touch operation with the Cancel key 54b (S115: Yes/corresponding to the aforementioned T6), then the CPU 11 carries out a process to discharge the card C (S129), and returns the process to S102. Thereby, the LCD 16 displays the standby screen 51 instead of the screen 54. On the other hand, when reading the card C is finished without the CPU 11 accepting any touch operation with the Cancel key 54b (S115: No, and S116: Yes), then the CPU 11 returns the process to S102. In such case, the LCD 16 also displays the standby screen 51 instead of the screen 54. Further, in S116, when reading the card C is not finished (S116: No), then the CPU 11 returns the process to S114, and stands by either for a touch operation with the Cancel key 54b or for the reading to be finished.

With the standby screen 51 being displayed, when the CPU 11 accepts a touch operation with the setting registration key 51b (S104: Yes/corresponding to the aforementioned T8), then the CPU 11 causes the LCD 16 to display the screen 55 instead of the standby screen 51 (S122). With the screen 55 being displayed, when the CPU 11 accepts a touch operation with the Cancel key 55b (S123: Yes/corresponding to the aforementioned T11), then the CPU 11 returns the process to S102. Thereby, the LCD 16 displays the standby screen 51 instead of the screen 55. On the other hand, with the screen 55 being displayed, when the CPU 11 determines, based on the signal inputted from the cover open/closed detection sensor 20, that the cover 3 is opened (S123: No, and S124: Yes/corresponding to the aforementioned T12), then the CPU 11 causes the LCD 16 to display the screen 56 instead of the screen 55 (S125). Further, when the CPU 11 determines, without accepting any touch operation with the Cancel key 55b, that the cover 3 is closed as it is (S124: No), then the CPU 11 returns the process to S123.

With the screen 56 being displayed, when the CPU 11 accepts a touch operation with the Cancel key 56e (S126: Yes/corresponding to the aforementioned T15), then the CPU 11 returns the process to S102. Thereby, the LCD 16 displays the standby screen 51 instead of the screen 56. On the other hand, when the CPU 11 accepts a touch operation with any of the shortcut keys 56b to 56d (S126: No, and S127: Yes/corresponding to the aforementioned T13), then the CPU 11 causes the screens 57 to be displayed to carry out the process of setting shortcuts (S128). Further, as described above, when carrying out the series of registration processes, the CPU 11 causes the plurality of screens 57 to be switched in display every time. On finishing the process of S128 (corresponding to the aforementioned T14), the CPU 11 returns the process to S125. Thereby, the LCD 16 displays the screen 56 instead of the screen 57. On the other hand, when the CPU 11 does not accept any touch operation with any of the respective keys 56b to 56e (S127: No), then the CPU 11 returns the process to S126, and stands by for a touch operation with any of the respective keys 56b and 56e.

With the standby screen 71 being displayed, when the CPU 11 accepts an input operation with the function selection key 71a (S118: No, and S119: Yes/corresponding to the aforementioned T31), then the CPU 11 causes the LCD 16 to display the screen 72, instead of the standby screen 71, in accordance with the sub-function corresponding to the input-manipulated function selection key 71a (S120), so as to carry out the selected sub-function (S121). Then, when finished with carrying out that sub-function, the CPU 11 returns the process to S116. Thereby, the LCD 16 displays the standby screen 71 instead of the screen 72. On the other hand, when the CPU 11 does not accept any touch operation with the function selection key 71a (S119: No), then the CPU 11 stands by for a touch operation with the function selection key 71a.

Further, in spite of no illustration, in parallel with the above main process, the CPU 11 carries out another process to detect any change in the opening and closing states of the cover 3 based on a signal inputted from the cover open/closed detection sensor 20. In this process, when the CPU 11 detects any change in the opening or closing state of the cover 3, when screen change is permitted, then the CPU 11 shifts the process to S102 or S117 for causing the LCD 16 to display the standby screen corresponding to the opening or closing state of the cover 3 (i.e., either the standby screen 51 or the standby screen 71). As examples, the case of permitting screen change occurs, for instance, in carrying out the function (Scan to PC) of causing a personal computer connected to the CDS 1 to store the document image data, etc. Thus, for example, with the screen 72 being displayed while carrying out the "Scan to PC", when the CPU 11 detects that the cover 3 is closed, then the CPU 11 shifts the process to S102 to cause the LCD 16 to display the standby screen 51 instead of the standby screen 71.

FIGS. 11A, 11B and 12A to 12C are flowcharts showing an error display process carried out by the CPU 11 according to the control program 12a. This process is started when some error occurs in the CDS 1. Further, when some error occurs, then the aforementioned main process is suspended and waits to be further carried out. First, when the CPU 11 determines that the cover 3 is opened (S201: Yes), then it causes the LCD 16 to display the error screen 81 (S202). With the error screen 81 being displayed, when the CPU 11 determines that the cover 3 is closed (S203: Yes/corresponding to the aforementioned T47), then the CPU 11 causes the LCD 16 to display the standby screen 51 including the error display E2 instead of the error screen 81 (S211).

On the other hand, with the error screen 81 being displayed, when the CPU 11 detects that with the cover 3 being opened as it is, the user has manually removed the error (S203: No, and S204: Yes/corresponding to the aforementioned T41), then the CPU 11 shifts the process to S117 of the main process. Thereby, the LCD 16 displays the standby screen 71 instead of the error screen 81, while the main process is resumed from S117. Further, when the present error is removed (S204: No, and S205: Yes/corresponding to the aforementioned T42) by carrying out the process based on the result that with the cover 3 being opened as it is, the CPU 11 has accepted a operation with the X key 15c, then the CPU 11 also shifts the process to S117 of the main process.

On the other hand, when the present error is not removed but remains (S205: No, and S206: Yes/corresponding to the aforementioned T43) even though with the cover 3 being opened as it is, the CPU 11 has accepted the operation with the X key 15c, then the CPU 11 causes the LCD 16 to display the standby screen 71 including the error display E1 instead of the error screen 81 (S207). Further, when the cover 3 is opened as it is, when the present error still remains, and when the CPU 11 still does not accept any operation with the X key 15c (S206: No), then the CPU 11 returns the process to S203.

With the standby screen 71 including the error display E1 being displayed, when the CPU 11 accepts a touch operation with the detail key E1a (S208: Yes/corresponding to the aforementioned T44), then the CPU 11 returns the process to S202. Thereby, the LCD 16 displays the error screen 81 instead of the standby screen 71 including the error display E1. On the other hand, when the CPU 11 detects, without accepting any touch operation with the detail key E1a, that the user has manually removed the error (S208: No, and S209: Yes/corresponding to the aforementioned T45), then CPU 11 shifts the process to S117 of the main process. Thereby, the LCD 16 displays the normal standby screen 71 instead of the standby screen 71 including the error display E1, while the main process is resumed from S117.

When the CPU 11 determines, without detecting any removal of the error in S209, that the cover 3 is closed (S209: No, and S210: Yes/corresponding to the aforementioned T46), then CPU 11 causes the LCD 16 to display the standby screen 51 including the error display E2 instead of the standby screen 71 including the error display E1 (S211). On the other hand, in S210, when the CPU 11 determines that the cover 3 is opened as it is (S210: No), then the CPU 11 returns the process to S208. With the standby screen 51 including the error display E2 being displayed, when the CPU 11 determines that the cover 3 is opened (S212: Yes/corresponding to the aforementioned T48), then CPU 11 returns the process to S202. Thereby, the LCD 16 displays the error screen 81 instead of the standby screen 51 including the error display E2. On the other hand, in S212, when the CPU 11 determines that the cover 3 is closed as it is (S212: No), then the CPU 11 stands by for the cover 3 to be opened.

On the other hand, in S201, when the CPU 11 determines that the cover 3 is closed (S201: No), then it causes the LCD 16 to display the error screen 91 (S301). With the error screen 91 being displayed, when the CPU 11 detects that with the cover 3 being opened as it is, the user has manually removed the error (S302: Yes/corresponding to the aforementioned T51), then CPU 11 shifts the process to S102 of the main process. Thereby, the LCD 16 displays the standby screen 51 instead of the error screen 91, while the main process is resumed from S102. Further, when the present error is removed (S302: No, and S303: Yes/corresponding to the aforementioned T52) by carrying out the process based on the result that with the cover 3 being closed as it is, the CPU 11 has accepted a touch operation with the Cancel key 91b, then the CPU 11 also shifts the process to S102 of the main process.

On the other hand, with the cover 3 being not opened, when the present error is not removed but remains (S303: No, and S304: Yes/corresponding to the aforementioned T53) even though the CPU 11 has accepted the touch operation with the Cancel key 91b, then the CPU 11 causes the LCD 16 to display the standby screen 51 including the error display E3 instead of the error screen 91 (S320). With the standby screen 51 including the error display E3 being displayed, when the CPU 11 accepts a touch operation with the detail key E3a (S321: Yes/corresponding to the aforementioned T54), then the CPU 11 returns the process to S301. Thereby, the LCD 16 displays the error screen 91 instead of the standby screen 51 including the error display E3. On the other hand, when the CPU 11 does not accept any touch operation with the detail key E3a, then the CPU 11 stands by for a touch operation with the detail key E3a.

With the error screen 91 being displayed, when the cover 3 is not opened, when the present error still remains, and when the CPU 11 still does not accept any operation with the Cancel key 91b (S304: No, and S305: No), then the CPU 11 returns the process to S302. On the other hand, in S305, when the CPU 11 determines that the cover 3 is opened (S305: Yes/corresponding to the aforementioned T55), then the CPU 11 sets the operation key 15 (the keys 15a to 15c), which is provided on the upper side of the main body 2, to a manipulatable state (an effective state), while turning on a back light (not shown) of the operation key 15 (S306). In such case, even when the cover 3 is opened, the error screen 91 is continuously displayed as it is.

With the cover 3 being opened, and with the error screen 91 being displayed, when the CPU 11 determines that the cover 3 is closed (S307: Yes/corresponding to the aforementioned T56), then the CPU 11 sets the operation key 15 (the keys 15a to 15c), which is provided on the upper side of the main body 2, to an ineffective state, while turning off the back light of the operation key 15 (S322), and shifting the process to S302. In such case, the error screen 91 is also continuously displayed as it is. On the other hand, with the cover 3 being opened, and with the error screen 91 being displayed, when the present error is removed (S307: No, and S308: Yes/corresponding to the aforementioned T57) by carrying out the process based on the result that the CPU 11 has accepted a operation with the Cancel key 91b or the X key 15c, then the CPU 11 causes the LCD 16 to display the screen 94 instead of the error screen 91 (S323). With the screen 94 being displayed, when the CPU 11 determines that the cover 3 is closed (S324: Yes/corresponding to the aforementioned T58), then the CPU 11 shifts the process to S102 of the main process. Thereby, the LCD 16 displays the standby screen 51 instead of the screen 94, while the main process is resumed from S102. On the other hand, in S324, when the CPU 11 determines that the cover 3 is opened as it is (S324: No), then the CPU 11 stands by for the cover 3 to be closed.

With the cover 3 being opened, and with the error screen 91 being displayed, when the present error is not removed but remains (S308: No, and S309: Yes/corresponding to the aforementioned T59) even though the CPU 11 has accepted the operation with the Cancel key 91b or the X key 15c, then the CPU 11 causes the LCD 16 to display the screen 95 instead of the error screen 91 (S325). With the screen 95 being displayed, when the CPU 11 determines that the cover 3 is closed (S326: Yes/corresponding to the aforementioned T60), then the CPU 11 returns the process to S320. Thereby, the LCD 16 displays the standby screen 51 including the error display E3 instead of the screen 95. On the other hand, in S326, when the CPU 11 determines that the cover 3 is opened as it is (S326: No), then the CPU 11 stands by for the cover 3 to be closed.

With the cover 3 being opened, and with the error screen 91 being displayed, when the CPU 11 detects, without accepting any operation with the Cancel key 91b or the X key 15c, that the user has manually removed the error (S309: No, and S310: Yes/corresponding to the aforementioned T61), then CPU 11 causes the LCD 16 to display the screen 92 instead of the error screen 91 (S311). On the other hand, in S310, when the CPU 11 does not detect that the user has manually removed the error (S310: No), then the CPU 11 returns the process to S308.

With the screen 92 being displayed, when the CPU 11 determines that the cover 3 is closed (S312: Yes/corresponding to the aforementioned T62), then the CPU 11 causes the LCD 16 to display the screen 93 instead of the screen 92 (S317). On the other hand, with the screen 92 being displayed, when the CPU 11 accepts a operation with the Home key 15b, and determines that the card C is absent from the first path V1 based on the input signals from the card detection sensor 21 and a discharge-complete sensor (not shown) (S313: Yes, and S314: No/corresponding to the aforementioned T64), then the CPU 11 shifts the process to S117 of the main process. Thereby, the LCD 16 displays the standby screen 71 instead of the screen 92, while the main process is resumed from S117. Further, the unshown discharge-complete sensor is a well-known sensor such as an optical sensor or the like, which is provided in the vicinity of the discharge slot 2a in the path 102 to detect the completion of discharging the manuscript from the discharge slot 2a (the card C or document D). For example, when the discharge-complete sensor detects the anterior end of the card C transported in the transport direction, then it outputs a high-level signal to the CPU 11 and, thereafter, when the card C is no longer detected, it outputs a low-level signal to the CPU 11. Based on the input signal from the card detection sensor 21, the CPU 11 determines that the card C is inserted and, thereafter, when it detects the falling of the signal inputted from the discharge-complete sensor, then the CPU 11 determines that the discharge of the card C is completed (that is, the card C is absent from the first path V1).

Further, with the screen 92 being displayed, when the CPU 11 accepts a operation with the Home key 15b, and determines that the card C is present in the first path V1 (S314: Yes/corresponding to the aforementioned T65), then the CPU 11 causes the LCD 16 to display the standby screen 71 including the error display E4 instead of the screen 92 (S315). With the standby screen 71 including the error display E4 being displayed, when the CPU 11 determines that the cover 3 is closed (S316: Yes/corresponding to the aforementioned T66), then the CPU 11 shifts the process to S317. Thereby, the LCD 16 displays the screen 93 instead of the standby screen 71 including the error display E4. On the other hand, in S316, when the CPU 11 determines that the cover 3 is opened as it is (S316: No), then the CPU 11 stands by for the cover 3 to be closed.

With the screen 93 being displayed, when the CPU 11 accepts a touch operation with the OK key 93a (S318: Yes/corresponding to the aforementioned T63), then similar to the process of S129, the CPU 11 causes the card C to be discharged from the discharge slot 2a1 (S319), and then shifts the process to S102 of the main process. Thereby, the LCD 16 displays the standby screen 51 instead of the screen 93, while the main process is resumed from S102. On the other hand, when the CPU 11 determines that no touch operation with the OK key 93a is accepted (S318: No), then the CPU 11 stands by for a touch operation with the OK key 93a.

According to the CDS 1 in this embodiment, with the functions usable in the reading function (scanning function), there are displayed different screens of tree structure according to the opening and closing states of the cover 3. Thus, the user is able to use, while clearly realizing, the particular functions for the type of the manuscript (the card C or document D) readable according to the opening or closing state of the cover 3, whereby each function is easy to use.

In the above embodiment, the CDS 1 is an example of the image reading apparatus. The image reading sensor 18 is an example of the reading portion. The cover 3 is an example of the switching portion. The LCD 16 is an example of the displaying portion. The CPU 11 is an example of the controller as well as an example of the controlling portion (display control mechanism). The cover open/closed detection sensor 20 is an example of the detecting portion. The cover 3 is an example of the cover. The Back key 15a, Home key 15b and X key 15c are an example of the first manipulating element. The Back key 15a is an example of the manipulating element usable for setting the reading set values. The setting registration key 51b is an example of the second manipulating element. The X key 15c is an example of the first cancellation manipulating element. The Cancel key 91b is an example of the second cancellation manipulating element. Between the screen group of the tree structure related to reading the card C, and the screen group of the tree structure related to reading the document D, one is an example of the first screen, and the other is an example of the second screen. Between the first path V1 and the second path V2, one is an example of the first path, and the other is an example of the second path. The standby screen 51 and standby screen 71 are an example of the uppermost screen. The screen 56 and screen 57 are an example of the setting screen belonging to the first screen. The error screen 91 is an example of the error screen including the second cancellation manipulating element. The error screen 81 is an example of the error screen not including the second cancellation manipulating element. The error displays E1 and E3 are an example of the message indicating that an error is occurring.

Although the present teaching is explained above based on the embodiment, it is easy to infer that the present teaching is not limited in any way to the above-mentioned embodiment, but various modifications and changes are possible without departing from the true spirit and scope of the present teaching. For example, in the above embodiment, the CDS 1, a monofunctional scanner apparatus, is presented as an example of the image reading apparatus. However, any multifunctional peripheral device (multifunction printer), which also has other functions than the reading function (scanning function) such as a printer function, FAX transmitting and receiving function, etc., may also be an example of the image reading apparatus.

In the above embodiment, it is configured to switch the transport path for the manuscript as the reading object between the first path V1 and the second path V2 according to whether the cover 3 is opened or closed. However, it is also configurable to provide a dedicated switching button, for example, to switch the transport path between the first path V1 and the second path V2 according to the state of this button. Further, this button may be either a hardware key or a software key. Further, it is also configurable to switch the transport path either according to whether or not the manuscript (card C) is nipped by the transport rollers 104 and 105 based on the detection of the card detection sensor 21, or according to which of the card detection sensor 21 and the document detection sensor 22 has detected the manuscript. For example, when the card C is nipped by the transport rollers 104 and 105, then the transport path may be switched to the first path V1, whereas when the card C is discharged and no longer nipped by the transport rollers 104 and 105, then the transport path may be switched to the second path V2.

In the above embodiment, it is configured to switch the transport path for the manuscript as the reading object between the first path V1 and the second path V2 according to whether the CDS 1 is opened or closed, and bring forth different screen groups of the tree structure related to the reading according to the respective transport paths, i.e., according to the manuscript types. However, it is also configurable to bring forth different screen groups of the tree structure related to the reading according to the difference in the method or mode of supplying the manuscript without being limited to the difference in the transport path. For example, when the image reading apparatus has a platen and an ADF, then it is possible to bring forth different screen groups of the tree structure related to the reading between the case of reading the card C supplied to the platen by the user, and the case of reading the document D supplied by the ADF. In such case, for example, it is possible to determine whether to read the card C or to read the document D according to whether the cover is opened or closed, or the like. Alternatively for example, when the image reading sensor 18 is configured to be installable and removable, then it is possible to determine whether to read the card C or to read the document D according to whether or not the image reading sensor 18 is installed.

In the above embodiment, it is configured to cause the LCD 16 provided in the CDS 1 to display various screens such as the standby screen 51 and the like. However, it is also configurable to present those screens on the display of an external device such as a PC or the like connected to the CDS 1. In such case, it is configurable to input the settings and instructions to the CDS 1 through the screens presented on the display of the external device.

In the above embodiment, the CDS 1 is configured as a scanner to read the card C inserted from the insertion slot 2b with the cover 3 being closed, as well as to read the document D inserted from the insertion slot 2c with the cover 3 being opened. However, these two types of the manuscript, which are each readable according to the opening or closing state of the cover 3, are not limited to the card C and the document D but, for example, may be both documents or may be both cards.

In the above embodiment, it is configured to provide the operation key 15 (all of the keys 15a to 15c) on the upper side of the main body 2 at a position to be covered when the cover 3 is closed. However, it is also configurable to expose part of the operation key 15 provided on the upper side of the main body 2 without being covered by the cover 3 even when the cover 3 is closed. For example, when the cover 3 is closed, part of the operation key 15 may be exposed from the opening 3c. When part of the operation key 15 is exposed even when the cover 3 is closed, then it is also possible to cause the LCD 16 not to display any software key or keys corresponding to that part of the operation key 15.

What is claimed is:

1. An image reading apparatus configured to read an image of a manuscript, comprising:
    a reading device configured to read the manuscript supplied by a first supply mode or by a second supply mode different from the first supply mode;
    a switching device configured to switch the supply mode between the first supply mode and the second supply mode;
    a display; and
    a controller which is configured to:
    cause the display to display a first screen related to reading, by the reading device, the manuscript supplied by the first supply mode in a case that the switching device switches the supply mode for supplying the manuscript to the first supply mode, and
    cause the display to display a second screen, which is different from the first screen, related to reading, by the reading device, the manuscript supplied by the second supply mode in a case that the switching device switches the supply mode to the second supply mode.

2. The image reading apparatus according to claim 1, further comprising: a first path through which the manuscript is to be transported to the reading device, and a second path through which the manuscript is to be transported to the reading device,
    wherein the first supply mode is applied to transport the manuscript through the first path, and the second supply mode is applied to transport the manuscript through the second path; the reading device is configured to read the manuscript transported through the first path or through the second path; the switching device is configured to switch the transport path for the manuscript to be read by the reading device between the first path and the second path; and the controller is configured to cause the display to display the first screen in a case that the switching device switches the transport path to the first path through which the manuscript is to be transported, as well as to cause the display to display the second screen in a case that the switching device switches the transport path to the second path through which the manuscript is to be transported.

3. The image reading apparatus according to claim 2, wherein the first screen is to be controlled to perform an operation related to carrying out a function usable in transporting the manuscript through the first path, and the second screen is to be controlled to perform an operation related to carrying out a function usable in transporting the manuscript through the second path.

4. The image reading apparatus according to claim 3, further comprising a detecting device configured to detect the switching operation of the switching device,
    wherein the image reading apparatus is configured to perform a plurality of other operations using the function of reading the manuscript by the reading device; the first screen includes a screen group which is constructed into a tree structure related to reading, by the reading device, the manuscript transported through the first path; the second screen includes another screen group which is constructed into another tree structure related to reading, by the reading device, the manuscript transported through the second path; the controller is configured to cause the display to display the uppermost screen in the screen group of the tree structure composing the first screen in a case that the detecting device detects that the switching device has switched the transport path whereby the manuscript is transported through the first path, as well as to cause the display to display the uppermost screen in the screen group of the tree structure composing the second screen in a case that the detecting device detects that the switching device has switched the transport path whereby the manuscript is transported through the second path; and the uppermost screen of at least one of the first screen and the second screen includes an operating element related to a function which is performable only when the reading device reads the manuscript transported through the transport path corresponding to the uppermost screen of at least one of the first screen and the second screen.

5. The image reading apparatus according to claim 2, further comprising:
    a main body in which the reading device is accommodated, and
    a cover provided to be openable from and closable to the main body,
    wherein the cover is configured to block the second path in a case that the cover is closed, and to open the second path in a case that the cover is opened; and
    the first path is configured to be constantly opened whether the cover is opened or closed.

6. The image reading apparatus according to claim 1, wherein the first screen includes a setting screen provided to set a reading set value related to reading, by the reading device, the manuscript transported through the first path; and in a case that the setting screen belonging to the first screen is displayed, even in a case that the detecting device detects that the switching device has switched the transport path, the controller is configured still not to cause the display to display the second screen.

7. The image reading apparatus according to claim 6, further comprising:
    a main body in which the reading device is accommodated, a cover provided to be openable from and closable to the main body, a first operating element which is provided at such a position as exposed with the cover being opened, but unexposed to face the cover with the cover being closed, and a detecting device provided to detect the switching operation of the switching device, wherein the switching device is the cover, and is configured to switch the manuscript transport path to the first path in a case that the detecting device detects that the cover is closed, as well as to switch the manuscript transport path to the second path in a case that the detecting device detects that the cover is opened;

the first operating element includes an operating element usable in setting the reading set value; the first screen includes a second operating element for displaying the setting screen; subject to the condition that the second operating element is manipulated, even when the detecting device detects that the cover has switched the transport path, the controller is configured still not to cause the display to display the second screen.

8. The image reading apparatus according to claim 7, wherein the operating element usable in setting the reading set value is such an operating element as commonly usable in both setting the reading set value related to reading, by the reading device, the manuscript transported through the first path, and setting the reading set value related to reading, by the reading device, the manuscript transported through the second path.

9. The image reading apparatus according to claim 1, further comprising:

a main body in which the reading device is accommodated, a cover provided to be openable from and closable to the main body, a first operating element which is provided at such a position as exposed with the cover being opened, but unexposed to face the cover with the cover being closed, and a detecting device provided to detect the switching operation of the switching device, wherein the switching device is the cover, and is configured to switch the manuscript transport path to the first path in a case that the detecting device detects that the cover is closed, as well as to switch the manuscript transport path to the second path in a case that the detecting device detects that the cover is opened; the first operating element includes a first cancellation operating element for removing errors; and controller is configured to cause the display to display an error screen indicating a second cancellation operating element which is a operating element for removing the errors but differs from the first cancellation operating element in a case that an error occurs with the cover being closed, as well as to cause the display to display another error screen not indicating the second cancellation operating element in a case that an error occurs with the cover being opened.

10. The image reading apparatus according to claim 9, wherein after causing the error screen indicating the second cancellation operating element to be displayed because an error has occurred with the cover being closed, the controller is configured to maintain the display of the error screen indicating the second cancellation operating element in a case that the detecting device detects that the cover is opened.

11. The image reading apparatus according to claim 9, wherein the first screen includes a screen group which is constructed into a tree structure related to reading, by the reading device, the manuscript transported through the first path; the second screen includes another screen group which is constructed into another tree structure related to reading, by the reading device, the manuscript transported through the second path; the controller is configured to cause the display to display the uppermost screen in the screen group of the tree structure composing the first screen in a case that the second cancellation operating element is operated, as well as to cause the display to display the uppermost screen in the screen group of the tree structure composing the second screen in a case that the first cancellation operating element is operated; and in a case that the first or second cancellation operating element is operated but the error still remains, then the controller is configured to cause a message indicating that the error is occurring to be displayed in the screen which is displayed by the display based on the operation of the first or second cancellation operating element.

\* \* \* \* \*